(12) United States Patent
Abiko

(10) Patent No.: US 7,894,087 B2
(45) Date of Patent: Feb. 22, 2011

(54) JOB PROCESSING ERROR AND SCHEDULE RECOVERY

(75) Inventor: Osamu Abiko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1219 days.

(21) Appl. No.: 11/195,669

(22) Filed: Aug. 3, 2005

(65) Prior Publication Data

US 2006/0028672 A1  Feb. 9, 2006

(30) Foreign Application Priority Data

Aug. 4, 2004  (JP) .............................. 2004-228015

(51) Int. Cl.
*G06K 15/00* (2006.01)
(52) U.S. Cl. ..................... 358/1.14; 358/1.15
(58) Field of Classification Search ................. 715/814, 715/844; 714/48, 57; 700/100; 358/1.14, 358/1.15, 1.4
See application file for complete search history.

(56) References Cited

U.S. PATENT DOCUMENTS

| | | | | |
|---|---|---|---|---|
| 4,339,657 A | * | 7/1982 | Larson et al. ................ 714/704 |
| 4,497,057 A | * | 1/1985 | Kato et al. ..................... 714/46 |
| 5,287,194 A | * | 2/1994 | Lobiondo .................... 358/296 |
| 5,363,481 A | * | 11/1994 | Tilt ............................. 715/814 |
| 5,490,089 A | * | 2/1996 | Smith et al. .................... 399/81 |
| 5,596,716 A | * | 1/1997 | Byers et al. .................... 714/48 |
| 5,625,757 A | * | 4/1997 | Kageyama et al. ......... 358/1.14 |
| 6,367,997 B2 | * | 4/2002 | Ito .............................. 400/582 |
| 6,552,813 B2 | * | 4/2003 | Yacoub ....................... 358/1.1 |
| 6,817,792 B2 | * | 11/2004 | Parry ........................... 400/74 |
| 6,894,800 B2 | * | 5/2005 | Sugaya ....................... 358/1.15 |
| 6,959,405 B2 | * | 10/2005 | Hite et al. ...................... 714/57 |
| 7,239,979 B1 | * | 7/2007 | McComber et al. ......... 702/185 |
| 7,298,501 B2 | * | 11/2007 | Christodoulou et al. ..... 358/1.12 |
| 2001/0015812 A1 | * | 8/2001 | Sugaya ........................ 358/1.1 |
| 2001/0038462 A1 | * | 11/2001 | Teeuwen et al. ........... 358/1.15 |
| 2002/0057455 A1 | * | 5/2002 | Gotoh et al. ............... 358/1.15 |
| 2002/0157043 A1 | | 10/2002 | Hite et al. |
| 2003/0016374 A1 | | 1/2003 | Christdoulou |
| 2005/0030574 A1 | * | 2/2005 | McVey et al. .............. 358/1.14 |

FOREIGN PATENT DOCUMENTS

JP    6-68104    3/1994

OTHER PUBLICATIONS

Chinese Office Action dated Jul. 17, 2009 in Counterpart Application No. 200510089583.0.
Chinese Office Action relating to Chinese Patent Application No. 200510089583.

* cited by examiner

*Primary Examiner*—Jerome Grant, II
(74) *Attorney, Agent, or Firm*—Fitzpatrick, Cella, Harper & Scinto

(57) ABSTRACT

Disclosed is a process control system for connecting a plurality of devices and a process control server, which manages the plurality of devices, via a network. The system accepts input of a job, creates a schedule of each device necessitated by the job that has been input and causes the job to be executed by each device based upon the schedule. If an error has occurred in a certain device during execution of the job, the system extracts executable operation contents based upon the schedule from operation contents stored previously with respect to the error, presents the operation contents and allows the operation contents to be selected, and updates the schedule in accordance with operation contents selected by an operator in charge in accordance with the displayed presentation.

9 Claims, 18 Drawing Sheets

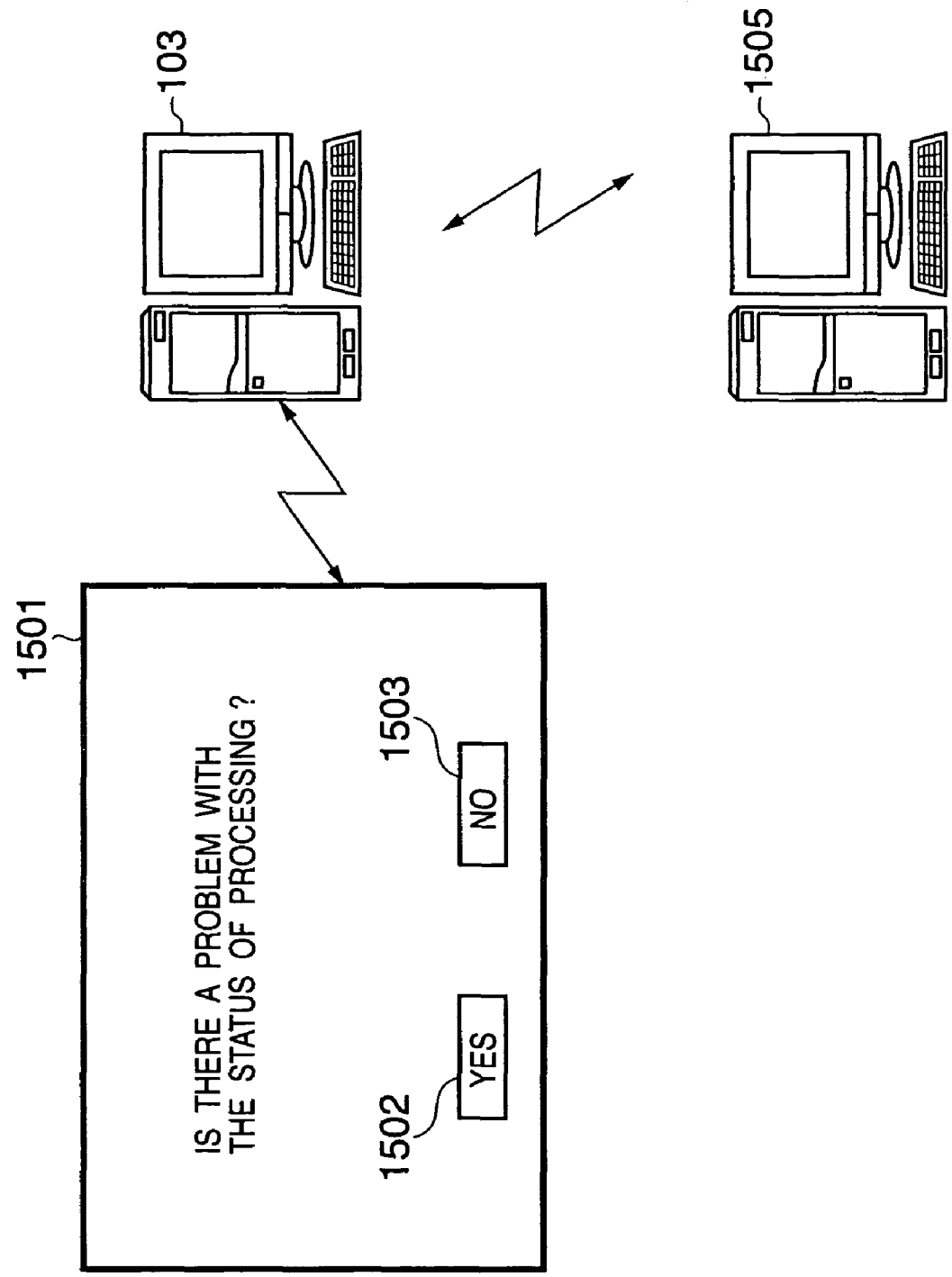

JOB PROCESSING ERROR AND SCHEDULE RECOVERY

FIELD OF THE INVENTION

This invention relates to a process control system, server and method for controlling an operating process performed among a plurality of devices interconnected via a network.

BACKGROUND OF THE INVENTION

At a printing site where printing is performed by POD (Print On Demand), a plurality of each of an image forming device for forming an image on a sheet, an image input device for inputting image data, and a sheet processing device for processing the printed sheets are interconnected via a network. The sheet processing devices are known as a binding device for binding a plurality of sheets, a stapling device for stapling a plurality of sheets and a case making device for covering a bundle of the bound sheets. In the printing site where printing is performed by POD, print processing using a network system, which is based upon a print job generated by a client computer and a print job introduced via the Internet, is executed. At such a printing site, one or a plurality of operators are employed in order to manage the plurality of printing devices. Furthermore, a process control server for managing each device, the contents of operations performed by the operators and the processing in a unified manner is connected to the network.

While cooperating with a front-end server, the process control server considers which job should be assigned to which device and decides to which job or device an operator should be deployed in accordance with receipt or input of a print job. When such a decision is made, the process control server checks the status and capability of each device and the state of the connection of the finisher and executes the scheduling of the overall system while estimating the processing time for each job.

Among the devices, there are devices connected via the network and on-line finishing devices that are not on the network. It is required that each of these devices be equipped with means capable of receiving instructions from the process control server. The job assigned to each device is processed in the length of time thus scheduled by the process control server. In the event that an unforeseen error or the like occurs, a message is displayed on a display unit that belongs to, e.g., the image forming device. The message relates to a maintenance operation for allowing the image forming device itself to recover from the error (see the specification of Japanese Patent Application Laid-Open No. 6-68104).

In the example of the prior art cited above, however, when the process control server acquires information from each device, the server merely acquires only predetermined information in one-sided fashion. This information is not satisfactory as information for resetting the process. A problem which arises, therefore, is that accurate process reset cannot be performed solely with the information acquired.

Further, in the event that an error of some kind has occurred in the image forming device, display of a specific error message can be presented to the operator using the display unit of the device. In the present state of the art, however, the error message is one that has been decided uniquely and is not a message that takes the overall process of the network system into account. For example, if paper has become jammed in a certain image forming device, the particular reason for jamming cannot be ascertained. Accordingly, the process control server cannot decide whether this image forming device should be as a device to be assigned a job or whether it should be temporarily excluded from a device to which a job is assigned.

Meanwhile, if paper jamming has occurred, the image forming device merely displays a message such as "CLEAR PAPER JAM" on the display unit of this device per se; no consideration is given to a so-called intelligent display scheme. Consider as an example a case where a network includes an image forming device that jams frequently. It is necessary to accurately determine not only the number of times jamming has occurred on a particular day but also the cause of the paper jam and the status of the image forming device, and to render a final decision on operation. For example, if the cause of jamming is the moisture of the paper fed, it is not necessary to call a serviceman but it is necessary to be mindful of control of the device environment, especially humidity. Changing the setting of an air conditioner, for example, is conceivable as an operation that can be performed by the operator in such case. However, present-day process control servers cannot make such flexible decisions and responses as the circumstances demand.

Further, consider a situation where a certain image forming device has run out of size A4 paper. In such case it is impossible for a process control server to decide whether to instruct an operator to supply size A4 paper to this image forming device, whether this print job should be handed over to another image forming device in which size A4 paper has been loaded or, if size A3 paper has been loaded in the image forming device that has no A4 paper, whether 2-up printing should be performed on the size A3 paper by this image forming device and whether the size A3 paper thus printed on should be cut by the operator using a trimmer to obtain a printing effect equivalent to that which would have been obtained by printing on size A4 paper.

Further, even if the operator is instructed to supply the paper, at present only a predetermined message such as "SUPPLY SIZE A4 PAPER" is displayed. Furthermore, even if the process control server issues an order to perform an operation, the server cannot send this order to the operator upon ascertaining whether the operator is accustomed to this work or what the state of health of the operator is on that particular day. By way of example, suppose that the operator has an aggravated back condition on a particular day and, as a consequence, a considerable length of time would be required for the operator to carry the paper from a warehouse where it has been stocked and load the paper into the image forming device in order to supply it with the size A4 paper. Such a determination cannot be made and the situation cannot be dealt with using a mechanical control method of a process control server.

When a problem of the above-mentioned kind arises, it is vital that a decision be made by the on-site operator. However, at a printing site of such scale that a large number of devices are connected in the system, it is difficult for the operator to grasp the overall system and it is highly likely that the decision will be made in accordance with an empirical rule. It is difficult to maintain that such an independent decision rendered by an operator will have an advantageous effect upon the process as a whole. For example, in a case where an image forming device has run out of size A4 paper, as mentioned above, assume that the operator has made an independent decision to print on size A3 paper in the 2-up format and to cut the paper after printing. Nevertheless, one on-site operator cannot ascertain all the necessary information, such as whether a trimmer has been installed at the printing site, whether the trimmer is in a state where it can be reserved for use, whether a worker skilled at handling the trimmer is available, and whether the work schedule of the trimmer operator will allow him to do the job.

SUMMARY OF THE INVENTION

Accordingly, an object of the present invention is to solve the problems of the prior art set forth above.

A feature of the present invention is to provide a process control system, server and method whereby when an error occurs in a device during the execution of a job by the device, it is possible to select an operation in accordance with a type of the error of the device.

According to an aspect of the present invention, there is provided with a process control server for managing a plurality of devices connected via a network, comprising:

a reception unit configured to receive a plurality of jobs to be executed in any of the plurality of devices;

a schedule setting unit configured to set a schedule to execute the plurality of jobs received by the reception unit;

a job execution unit configured to cause the each device to execute the job based upon the schedule set by the schedule setting unit;

an extraction unit, if an error has occurred in a device of the plurality of devices during execution of the job, configured to extract executable operation contents by the device with respect to the error; and a designation unit, if a plurality of operation contents extracted by the extraction unit exist, configured to cause the device to select one of the plurality of operation contents, wherein the schedule setting unit updates the schedule in accordance with the operation contents selected by the device in accordance with the designation by the designation unit.

According to an aspect of the present invention, there is provided with a process control method of managing a plurality of devices connected via a network, comprising:

a reception step of receiving a plurality of jobs to be executed in any of the plurality of devices;

a schedule setting step of setting a schedule of each device to execute the plurality of jobs received in the reception step;

a job execution step of causing the each device to execute the job based upon the schedule set by the schedule setting step;

an extraction step of, if an error has occurred in a device of the plurality of devices during execution of the job, extracting executable operation contents by the device with respect to the error; and a designation step of, if a plurality of operation contents extracted in the extraction step exist, causing the device to select one of the plurality of operation contents, wherein in the schedule setting step, the schedule is updated in accordance with the operation contents selected by the device in accordance with the designation in the designation step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 18 is a diagram useful in describing processing according to a fifth embodiment of the present invention.

DETAILED DESCRIPTION OF THE PREFERRED EMBODIMENTS

Preferred embodiments of the present invention will now be described in detail with reference to the accompanying drawings. It should be noted that the embodiments that follow do not limit the invention set forth in the claims and that all combinations of features described in the embodiments are not necessarily essential as means for attaining the invention.

Figure 1:
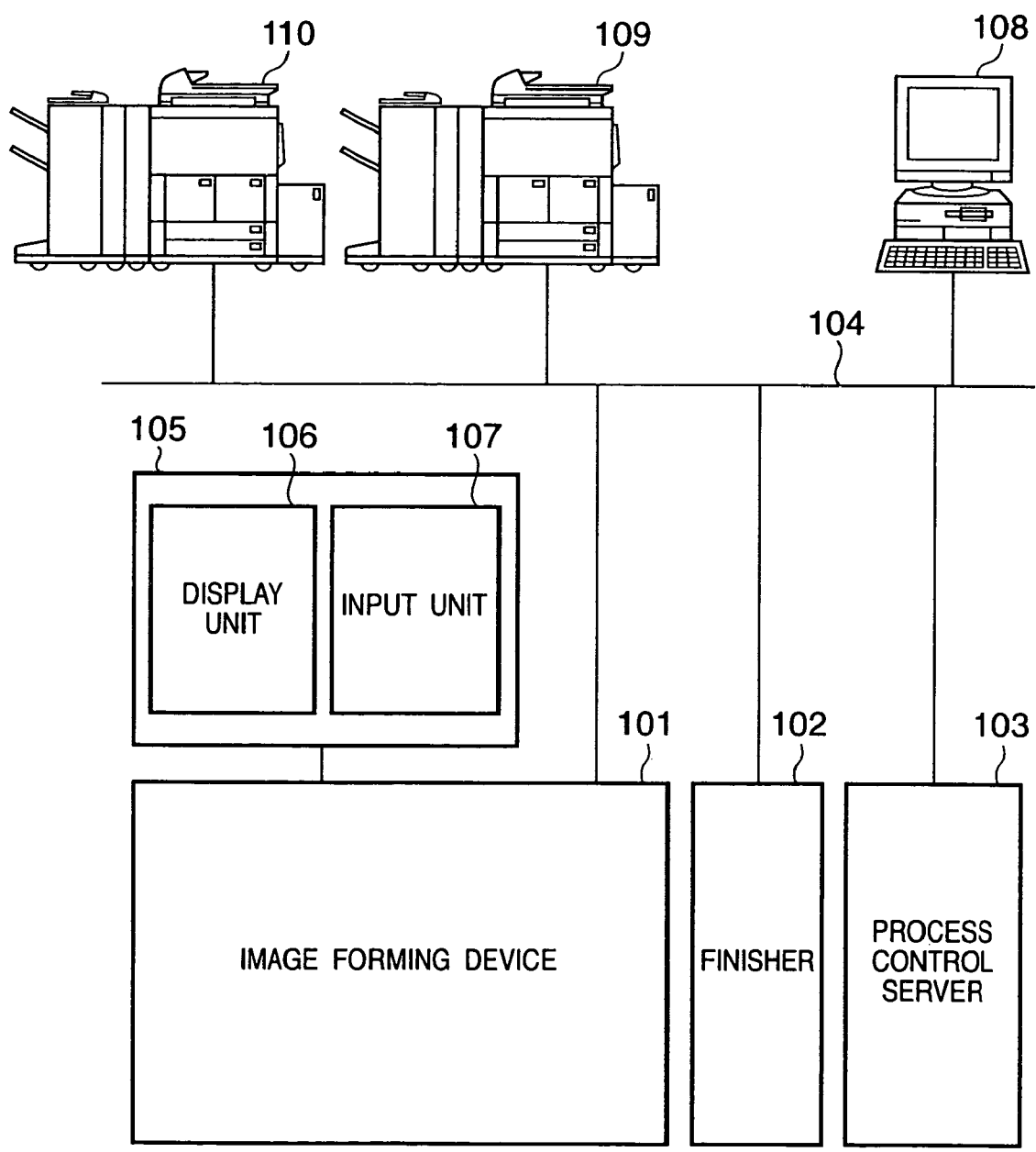
FIG. 1 is a diagram useful in describing the configuration of a printing system according to an embodiment of the present invention.

FIG. 1 is a diagram useful in describing the configuration of a printing system according to a first embodiment of the present invention.

An image forming device 101, such as a copier or printer, receives an input of image data and prints (forms) an image on a printing medium such as a printing sheet. The image forming device 101 may be connected to a finisher 102 directly by a special-purpose cable, or the image forming device 101 and finisher 102 may be connected to a network 104 directly by separate cables. By way of example, the finisher 102 is a stapling device for performing stapling, a hole punching device for punching holes, a gluing device for performing gluing, a booklet device for performing bookbinding. As an example of the finisher 102, there is a simple folding machine or a collector that is capable of separating printed matter into units on a per-copy basis. It should be noted that although the image forming device 101 and finisher 102 are each shown to be singular in FIG. 1, a plurality of these devices having identical or different functions may be provided.

A process control server 103, which is a server that manages the process of the overall printing site having this printing system, sends and receives various information via the network 104. Depending upon the type of job, the process control server 103 designs an operating process that decides which device (image forming device 101, finisher 102, etc.) should perform which operation, and optimizes the overall process. A console 105 is connected to the image forming device 101 in this example. To the operator, the console 5 serves as an interface to various information. The console 105 is equipped with a display unit 106 for presenting a display of information to the operator, and an input unit 107 for allowing the operator to make inputs. The console 105 may be equipped with a display unit and input unit comprising a simple touch-sensitive panel such as an LCD panel or a display monitor, mouse and keyboard. A computer 108, which is one on the network 104, may also exist in a local-area network or on the Internet. The computer 108 receives a print job that has been introduced to the printing site and manages the overall print job in cooperation with the process control server 103. Numerals 109 and 110 denote copiers or multi-function machines, etc. In the illustrated example, these are a plurality of image forming devices that have been connected to the network 104.

Figure 2:
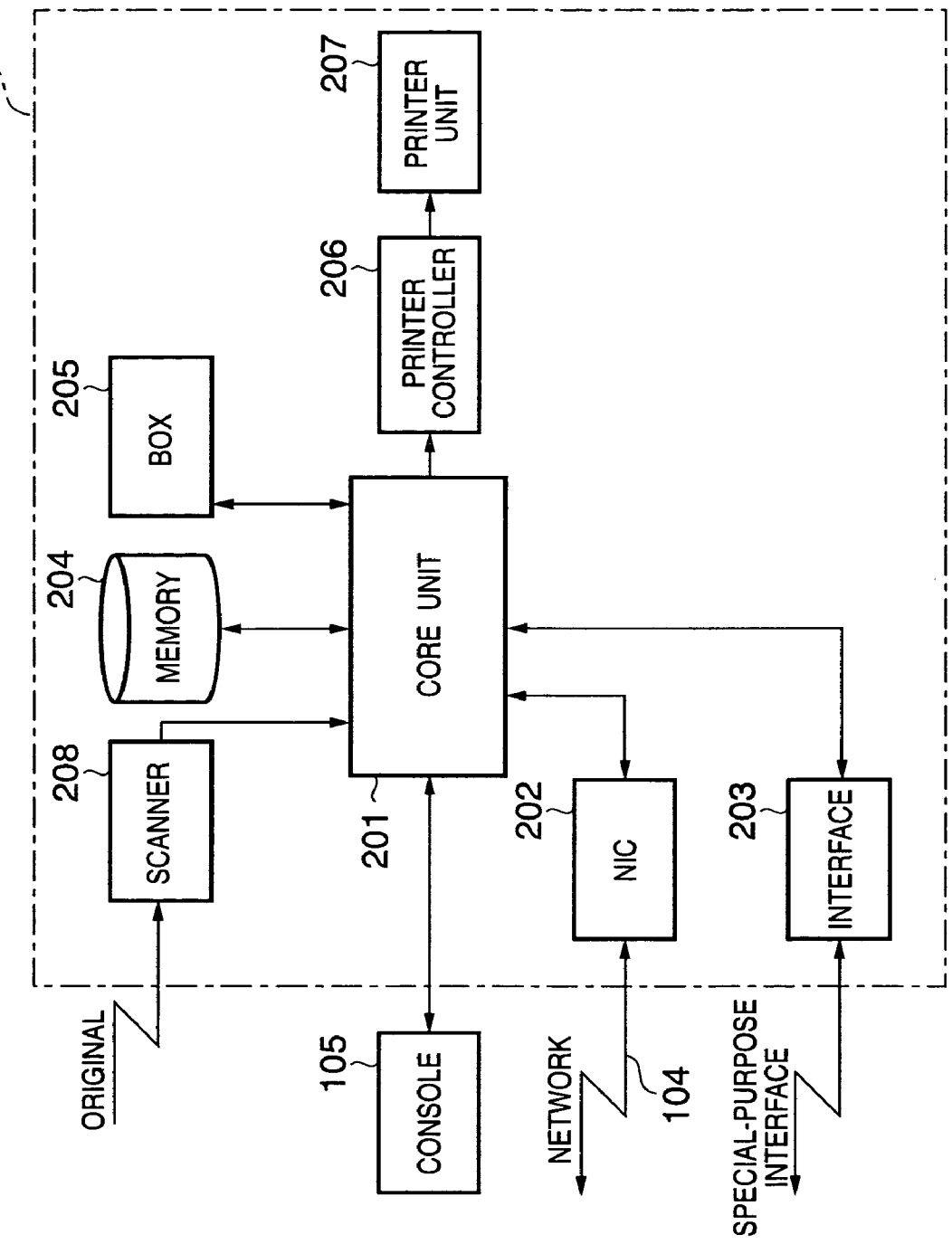
FIG. 2 is a block diagram for describing the functional configuration of an image forming device according to an embodiment of the present invention.

FIG. 2 is a block diagram for describing the functional configuration of the image forming device 101 according to this embodiment.

A core unit 201 in FIG. 1 takes charge of overall control of the image forming device 101. For example, the core unit 201 exercises comprehensive control such as control of copier jobs, print jobs, scan jobs, facsimile control jobs, network-related jobs, image processing and various interface control. The core unit 201 controls a series of operations such as controlling the receipt of a copy-start input from the console 105 and of various parameters relating to post-processing, the instructing of the scanner 208 to read (scan) image data. Further, the core unit 102 controls acquiring of a memory area for storing scanned image data, the assigning of a job ID to the image data, image processing to be applied to the scanned image data and transfer of data to a printer controller 206, and finally executing printing by a printer unit (printer engine) 207. Besides obtaining printed matter, the core unit 201 controls processing for storing a print job in a box 205, which is an area that serves as an electronic mailbox, or for storing image data in a memory 204 such as a RAM. Further, the core unit 201 plays an important role also as an interface with the console 105, and character strings displayed on the display unit 106 of the console 105 and information input by switches or buttons on the input unit 107 are controlled by cooperation between the core unit 201 and console 105. Display content specified via the network 104 is displayed on the display unit 106 of the console 105 and information that has been input from the input unit 107 of the console 105 is returned to the core unit 201, whereby commands transmitted via the network 104 are also controlled by the core unit 201.

An NIC unit 202 connected to the core unit 201 is a network interface for connection to the network 104. It is through the NIC unit 202 that a connection is made to the network 104, such as a local-area network (LAN) or Internet. The NIC unit 202 is connected to the network 104 by a cable or wireless network, and it is possible to communicate with the process control server 103 via the network 104. An interface 203 is a special-purpose interface for making a connection to the finisher 102 mentioned above.

Figure 3:
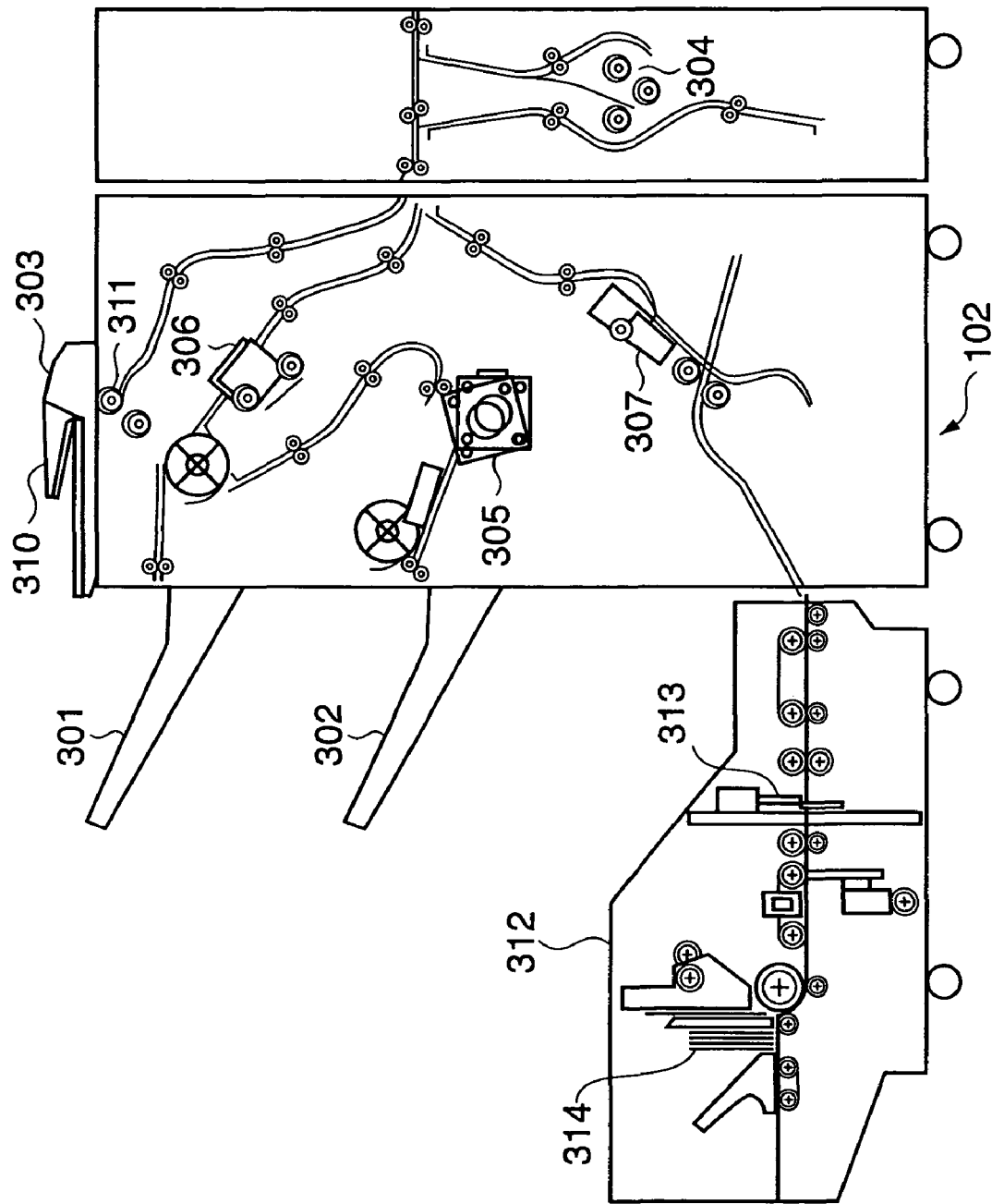
FIG. 3 is a diagram illustrating an example of a finisher according to this embodiment.

FIG. 3 is a diagram illustrating an example of the finisher 102 according to this embodiment. FIG. 3 is a sectional structural view of the finishing unit.

A printed sheet that has been ejected from the printer unit 207 of the image forming device 101 is sent to the finisher 102 of the kind shown in FIG. 3. The finisher 102 is connected to the network 104 by a cable or wirelessly and is capable of transmitting its own status to the process control server 103 via the network 104 by executing communication processing. On the other hand, solely the status of information can be transmitted to the process control server 103 by some means such as a handy terminal or memory card, although this is not shown hooked up to the network 104. In terms of operation in real time, however, the former set-up is more advantageous.

The structure of the finisher 102 will be described in simple terms with reference to FIG. 3.

The finisher 102 is provided with a sample tray 301 and stacking tray 302. These trays are switched between in dependence upon the type of job or number of sheets ejected, and sheets on which printing has been completed are ejected onto the tray to which the switch has been made. With regard to sheets to be ejected onto the stacking tray 302, the sheets may be accumulated on a per-job basis prior to ejection and then bound together by a stapler 305 immediately before they are ejected into the stacking tray 302. In addition, provided along the path to the two trays 301 and 302 are a Z-folding machine 304 for folding paper into a Z-shaped configuration, and a puncher 306 that punches two (or three) holes for paper-filing purposes. These execute processing in accordance with the type of job.

Furthermore, after the central portion of a sheet has been bound at two locations, a saddle stitcher 307 folds the central portion in half by engaging it with rollers and creates a booklet such as in the form of a weekly magazine or a pamphlet. In addition, although not shown in FIG. 3, it is also possible to apply binding by gluing for bookmaking or trimming for aligning the sheet edges on the side opposite the bound side after the completion of binding.

An inserter 303 is for sending a sheet, which has been placed in a tray 310, to the trays 301, 302 without passing it through the image forming device 101. This makes it possible for a sheet that has been placed in the inserter 303 to be inserted between sheets on which printing has been completed. Sheets for manual insertion are placed face-up on the tray 310 of the inserter 303 by the user, and the sheets are fed in order from the topmost sheet by a pick-up roller 311. Accordingly, sheets from the inserter 303 are transported as is to the trays 301, 302 and are ejected onto the trays face-down. When sheets are sent to the saddle stitcher 307, they are sent to the side of the puncher 306 and are then switched back and fed in, whereby the faces of the sheets are made to agree in terms of orientation.

A trimmer 312 will be described next.

A bundle of sheets that have been formed into a booklet (a center-bound booklet) in the saddle stitcher 307 enters the trimmer 312. First the booklet is fed a predetermined length by rollers and a predetermined length is cut off by a cutter 313. As a result, any edges of the plurality of pages of the booklet that were not aligned are made perfectly flush. The booklet is then accommodated in a booklet hold 314.

Figure 4:
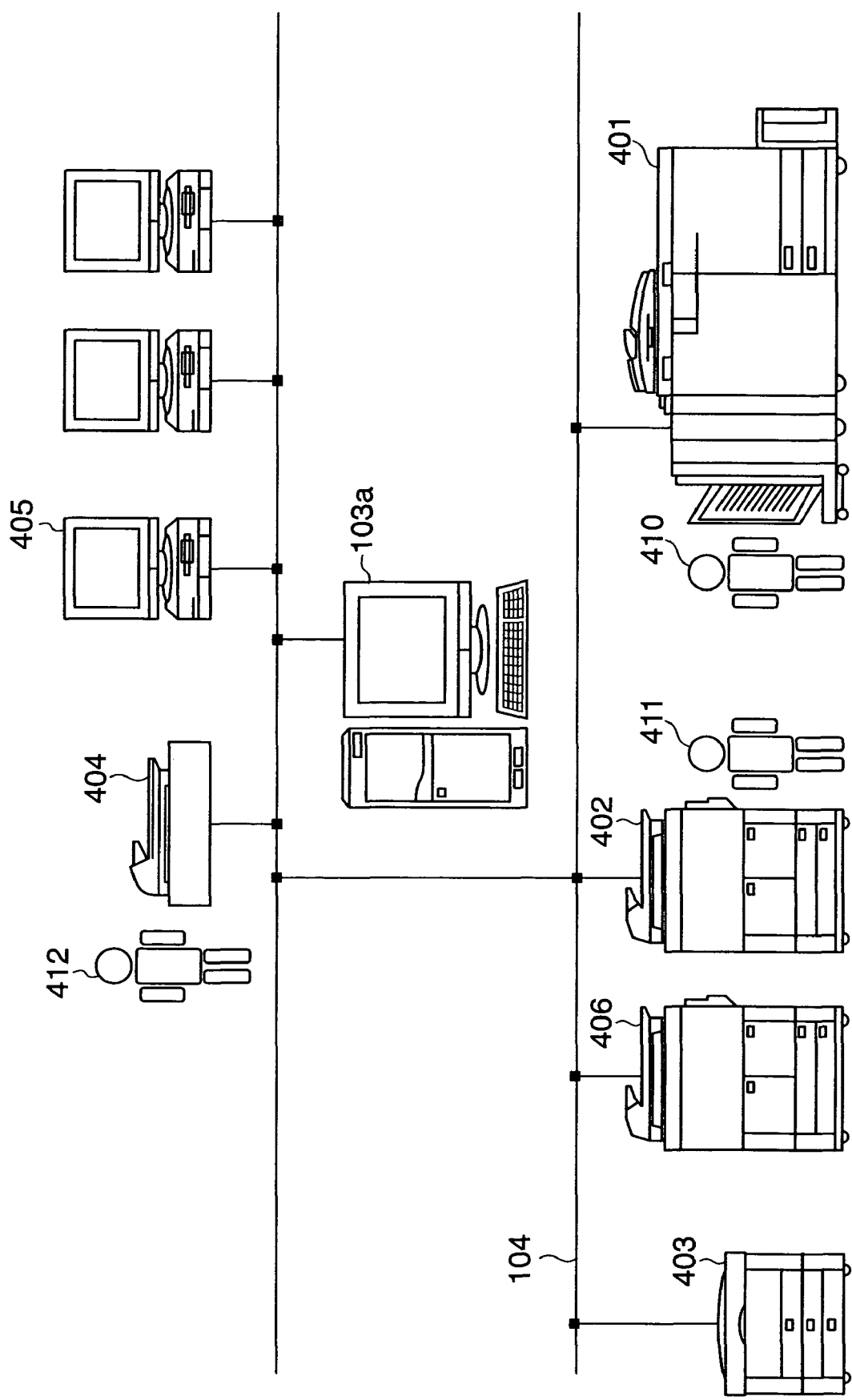
FIG. 4 is a diagram useful in describing the details of a process control server, connection environment thereof and operator deployment environment thereof according to this embodiment.

FIG. 4 is a diagram useful in describing the details of the process control server 103, the connection environment thereof and the operator deployment environment thereof according to the first embodiment of the present invention.

The process control server 103 may be a computer 103a in FIG. 4 or may be in a form in which it has been incorporated into any device as one process. In FIG. 4, there are a plurality image forming devices 401, 402 and 406 (which correspond to the image forming devices 109 and 110 in FIG. 1) and a trimmer 403 as devices connected to the network 104. Also connected are a scanner 404 serving as an image-data input device, and a computer 405 (which corresponds to the computer 108 in FIG. 1), which is a client or server. An operator 410 who is in charge of a job related to the image forming device 401 has been deployed at the image forming device 401. The operator 410 checks to see whether a job that has been delivered to the image forming device 401 equipped with a finisher is being printing reliably, whether finishing is being executed normally and whether supply of paper and stables is adequate. The operator 410 also transports the output product to a remotely located off-line collector or inserts the product into an envelope and transports it to a shipping station in order to be delivered to a customer. An operator 411 is similarly assigned to the image forming device 402 as the operator in charge.

An operator 412 has been deployed at the scanner 404, which is the input unit of the image data. The operator 412 performs an operation (scan and make ready) that includes reading in a document from a customer using the scanner 404, manipulating the read image data using the computer 405 or a controller connected to the network 104. In the operation, the operator 412 arranges the appearance (layout, font and the like) of the read image data and puts the image data in a state in which it can be printed immediately.

The process control server 103a acquires resource information concerning the image forming devices 401, 402, image input unit 404, finisher 403 and operators 410 to 412 from, e.g., the computer 405 through the network 104, etc., and executes processing using this data to prepare a schedule in relation to each of the devices and operations performed by the operators.

Figure 5:
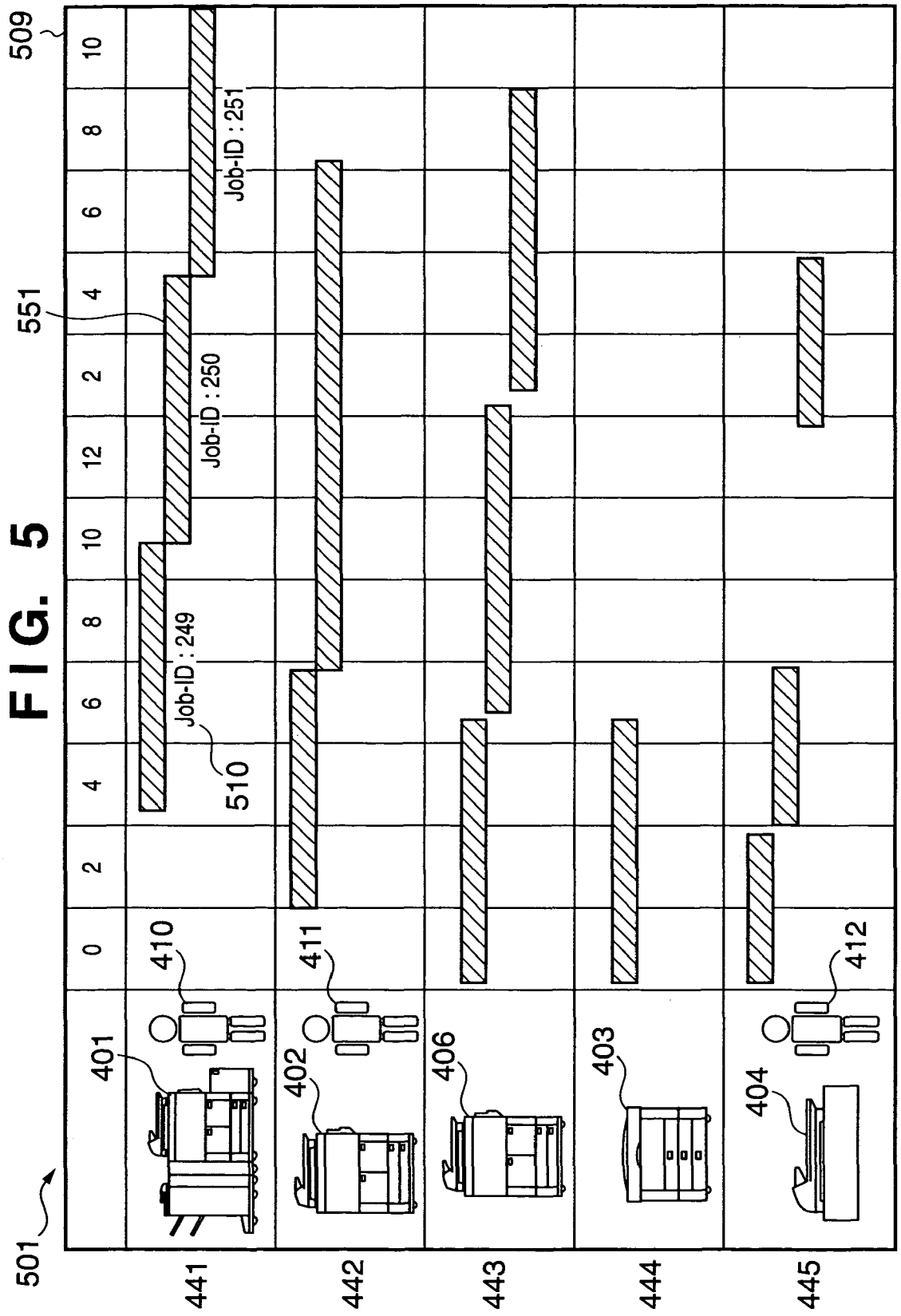
FIG. 5 is a diagram useful in describing the manner in which the conditions of the printing site shown in FIG. 4 are subjected to process control by the process control server.

FIG. 5 is a diagram useful in describing the manner in which conditions at the printing site shown in FIG. 4 are subjected to process control by using the process control server 103a.

A process control chart 501 in FIG. 5 is created and managed by the process control server 103a and indicates process control conditions in the form of a so-called Gantt chart. Reference numerals 401 and 402 correspond to the image forming devices of FIG. 4, and reference numerals 403 and 404 correspond to the trimmer and image input unit, respectively. Reference numerals 410 to 412 correspond to the operators in FIG. 4. Further, reference numerals 441 to 445 indicate operating processes executed by image forming devices 401, 402, 406, trimmer 403 and image input unit 404, respectively.

Reference numerals 509 and 510 denote numeric values indicating time and job ID, respectively. Side bars indicate the time periods of jobs. For example, a side bar 551 indicates the time period of job "Job-ID: 250". In accordance with chart 501, one can tell at a glance which operator has been assigned to what image processing device. Further, one can tell which operator is monitoring an operation having a particular job ID in which time period.

In the example of FIG. 5, an operating process (execution of a print job) using the image forming device 401 operated by the operator 410 has been scheduled to be performed continuously from time 4 in the order of the following jobs: "Job-ID: 249", "Job-ID: 250" and "Job-ID: 251". Operating processes by the other devices also have been similarly scheduled.

The process control server 103a discriminates job attributes that have been entered from, e.g., the computer 405 and selects the device that is capable of processing the job. For example, if the job is one specifying printing in which stabling is to be performed, then this job is assigned to the image forming device 401, which has a stapling capability. There are also cases where an image forming device at an assignment destination to which a job is to be assigned is decided depending upon the number of printed sheets specified by the print job. For example, if a print job involves the printing of a large number of sheets, then the job is assigned to an image forming device having a higher speed. If the job involves reading a paper original and converting it to electronic data, then the job is assigned to operating process 445, which uses the scanner 404.

Next, a specific example of the console 105 that includes the display unit 106 and input unit 107 will be described in detail with reference to FIG. 6.

Figure 6:
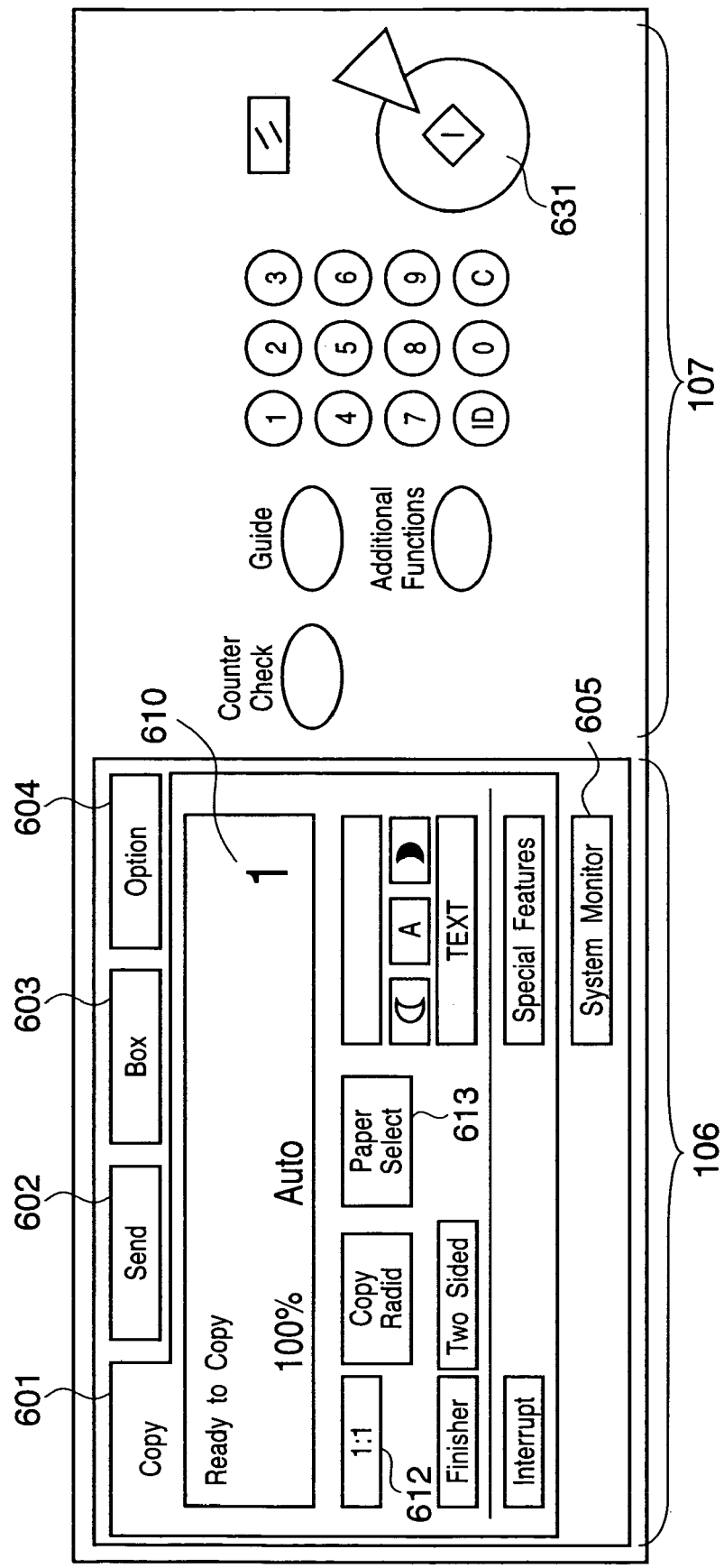
FIG. 6 depicts a schematic view of a console on an image forming device according to this embodiment.

FIG. 6 illustrates an example of the console 105 of the image forming device 401 according to this embodiment.

The console 105 has an LCD (liquid crystal display) display unit 106 of a touch-sensitive panel, and a key panel 107. In this example of FIG. 6, as a variety of modes can be set using a touch-panel, there are provided as examples of which are a copy mode (601) for performing a copying operation, a send mode (602) for performing scanning and transmission, a box mode (603) for extracting and editing items from a box and an option mode (604) for making various settings, as well as a system monitor 605 for ascertaining the status of the system. The operator 412 designates any of the mode selection keys 601 to 605 of the display unit 106 so as to set the corresponding mode.

In FIG. 6, by setting paper size (613), scaling ratio (612), image mode and finishing method in addition to number of copies (610) and then pressing a start key 631, a copying operation can be performed. The display unit 106 can display not only the usual screen indicating the copy mode but also an option mode for making various settings. In particular, in the option mode, the content of a display can be designed in accordance with an externally applied command, in accordance with a certain format or freely.

Next, processing will be described taking as an example a case where the image forming device 401 has run out of size A4 paper. In the prior art, a message of the kind "PLACE SIZE A4 PAPER IN THE PRESCRIBED SUPPLY TRAY" is merely displayed on the display unit 106 of the image forming device 401.

By contrast, in the first embodiment, the fact that an error indicative of depletion of size A4 paper has occurred in the image forming device 401 is recognized by the process control server 103a via the network 104. Accordingly, the conditions of the overall printing site being managed by the process control chart 501 shown in FIG. 5 are checked and the best possible solution available at the present time is decided. For example, assume that the print job in effect at the occurrence of the no-paper error is "Job-ID: 250" (551). Since no job whatsoever has been assigned to the trimmer 403 when the print job 551 is to be executed, it can be judged that the trimmer 403 is capable of being used by the print job 551. If the trimmer 403 is in a usable state, then even though the error indicative of no size A4 paper has occurred in image forming device 401, a judgment can be rendered to the effect that it will suffice to perform 2-up printing using size A3 paper, which has been loaded in the image forming device 401, and to cut the printed paper in half using the trimmer 403. In this case, as indicated at 701 in FIG. 7, the process control server 103a sends the console 105 of the image forming device 401 the following message: "AN ERROR INDICATING DEPLETION OF SIZE A4 PAPER HAS OCCURRED. THE TRIMMER IS IN A USABLE STATE. DO YOU WISH TO OUTPUT THE JOB ON SIZE A3 PAPER IN THE 2-UP FORMAT AND CUT THE PAPER?" and causes this message to be displayed on the display unit 106.

Figure 7:
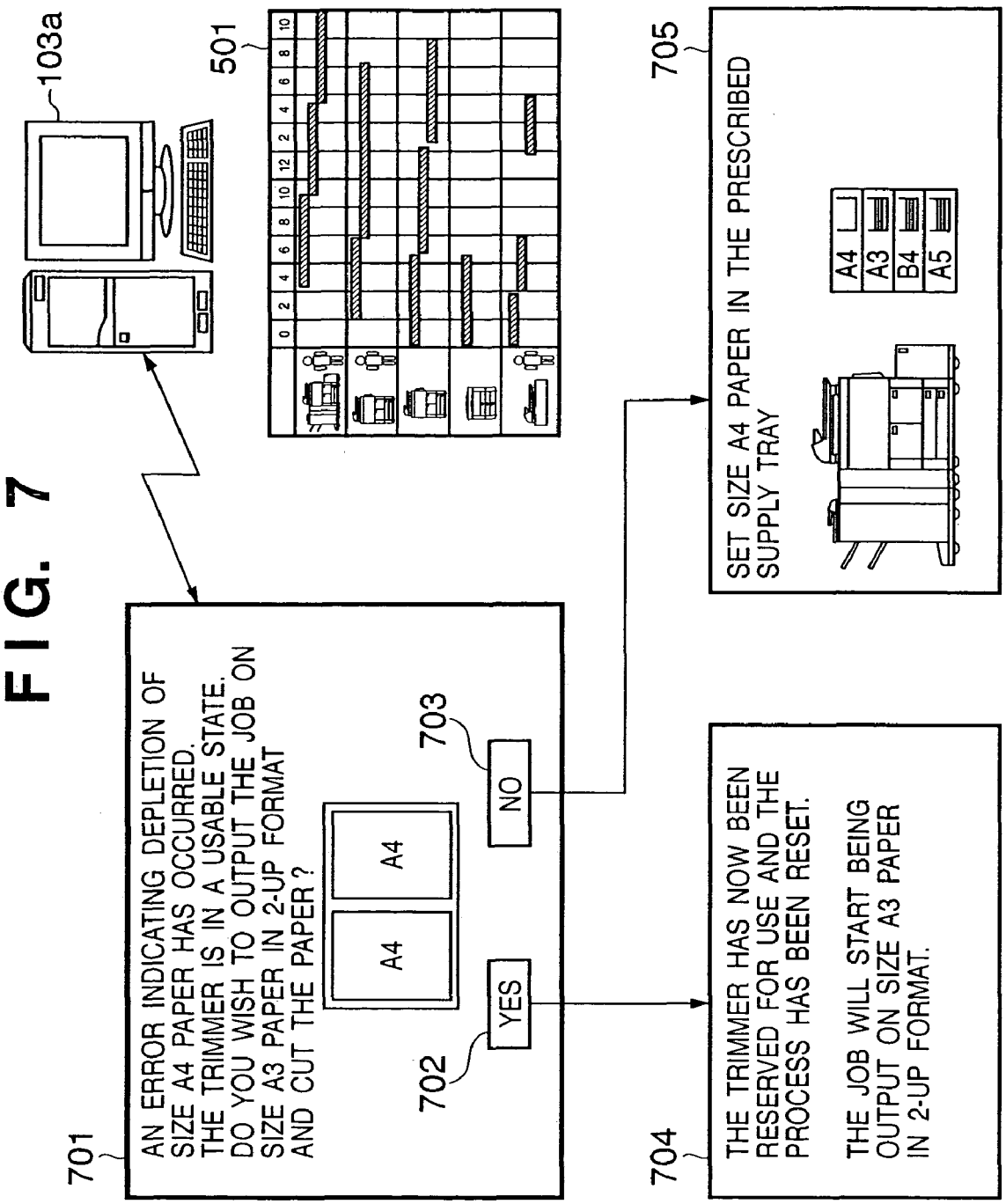
FIG. 7 is a diagram useful in describing messages displayed on the display unit of an image forming device from a process control server in a case where a "NO A4-PAPER ERROR" has occurred in an image forming device according to a first embodiment.

FIG. 7 is a diagram useful in describing messages displayed on the display unit 106 of the image forming device 401 from the process control server 103a in a case where the "NO A4-PAPER ERROR" has occurred in the image forming device 401 according to a first embodiment.

A further feature of the first embodiment is the process control server 103 does not decide everything. Instead, the on-site operator and the process control server 103a are linked interactively and the optimum decision is rendered based upon a "discussion" between the two. In other words, a message accepted from the process control server 103a is displayed on the display unit 106 of the console 105 of image forming device 401 and then a transition is made to processing that is in accordance with the response of the operator to the message. Means are provided for making it possible to reflect the opinion of the operator, who is best aware of the on-site conditions. Specifically, selection buttons indicating "YES" 702 and "NO" 703 are displayed on the display unit 106 and the operator 410 managing the image forming device 401 on site is allowed to select the direction in which operation should proceed next. For example, in the example indicated at 701 in FIG. 7, if the operator 410 selects the selection button "YES" 702 to thereby designate 2-up printing using size A3 paper, then the following message is displayed in a message window 704: "THE TRIMMER HAS NOW BEEN RESERVED FOR USE AND THE PROCESS HAS BEEN RESET. THE JOB WILL START BEING OUTPUT ON SIZE A3 PAPER IN THE 2-UP FORMAT". As a result, from this point onward, A4-size images are printed in the 2-up format using size A3 paper that has been loaded in the image forming device 401, the A3 paper thus printed on is cut in half by the trimmer 403 and print images can be obtained on the A4 paper.

Figure 8:
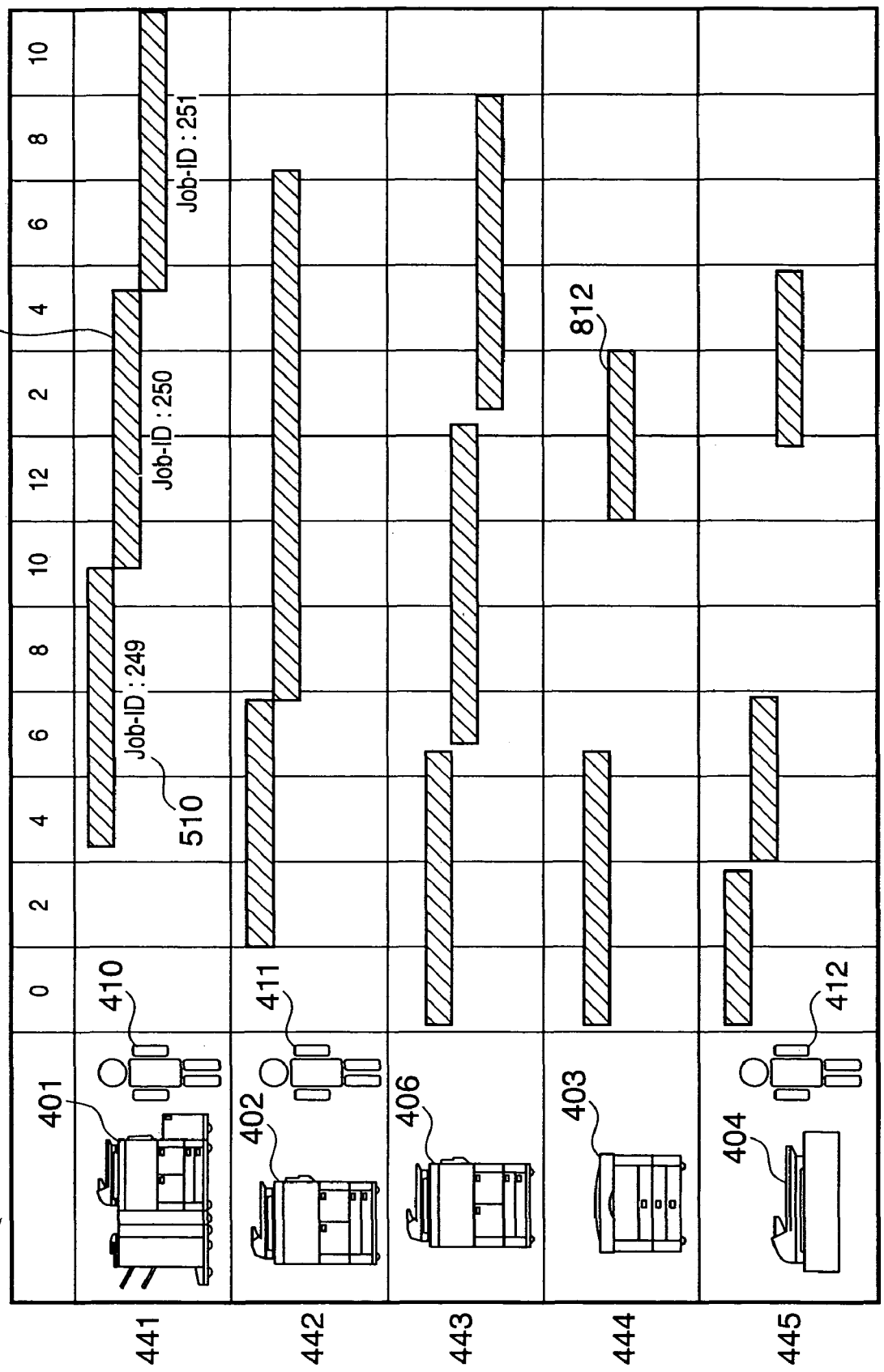
FIG. 8 is a diagram useful in describing an example of a process control chart that has been changed based upon result of a selection made in FIG. 7.

FIG. 8 is a diagram useful in describing an example of a process control chart 501a that has been changed based upon the result of the selection made above.

As indicated at 812 in FIG. 8, a trimming process by the trimmer 403 has been reserved for the print job "Job-ID: 250" and resetting of the overall process is carried out.

On the other hand, if the selects the selection button "NO" 703 in FIG. 7, then the following message: "SINCE AN ERROR INDICATING DEPLETION OF PAPER HAS OCCURRED, SUPPLY SIZE A4 PAPER" (705), which is displayed conventionally, is displayed on the display unit 106 of the image forming device 401.

Figure 9:
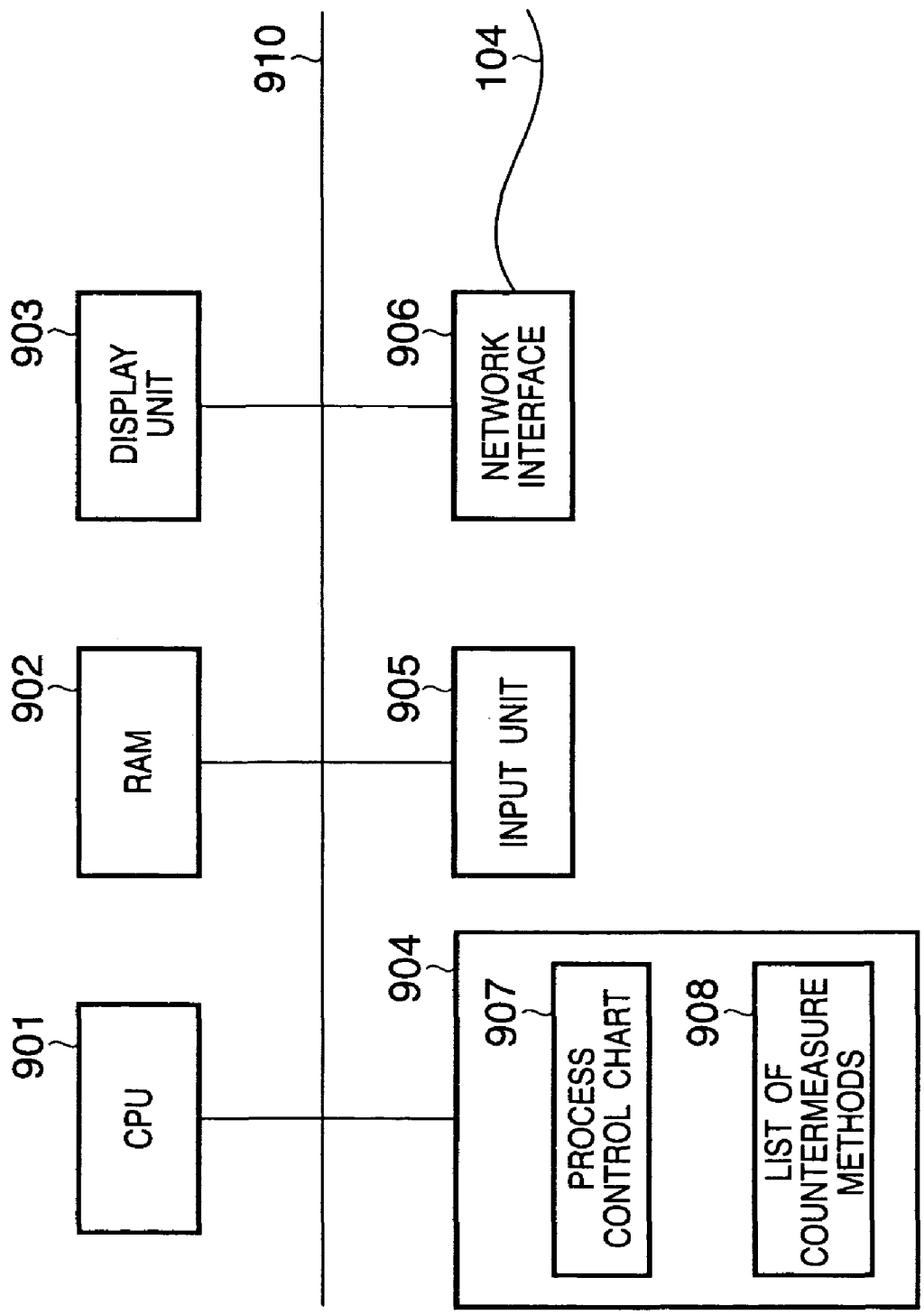
FIG. 9 is a block diagram for describing the structure of a process control server according to this embodiment.

FIG. 9 is a block diagram for describing the structure of the process control server 103 (103a) according to this embodiment.

A CPU 901, such as a microprocessor, controls the operation of the server 103 in accordance with a control program that has been stored in a memory (RAM) 902. Further, the RAM 902 provides a work area for storing various data temporarily at execution of control processing by the CPU 901. The control program, which has been installed in a storage device 904 such as a hard disk, is loaded in a program area of the memory 902 and executed at the time of program execution. A display unit 903, which has a display such as a CRT or liquid crystal, presents the user with a display of messages and various data. An external storage unit 904 has a large-capacity memory for storing the above-mentioned control program, etc., as well as a process control chart 907, such as illustrated in FIGS. 5 and 8, and a countermeasure method list 908. It should be noted that FIGS. 5 and 8 illustrate the content of the process control chart 907 in simple form. It is assumed that the actual process control chart 907 has a data structure in which the IDs and states of devices on the network, job IDs, the IDs of devices used by these jobs and the IDs of operators corresponding to the devices can be managed on a time axis. The countermeasure method list 908 describes countermeasure methods corresponding to each of the errors that can occur in each of the devices. One or a plurality countermeasure methods exist with respect to one error.

An input unit 905, which has a keyboard and mouse, is operated by the operator and used to input various data and commands. A network interface (I/F) 906 controls communication between the network 104 and this server. A system bus 910 connects each of these components to the CPU 901.

Figure 10:
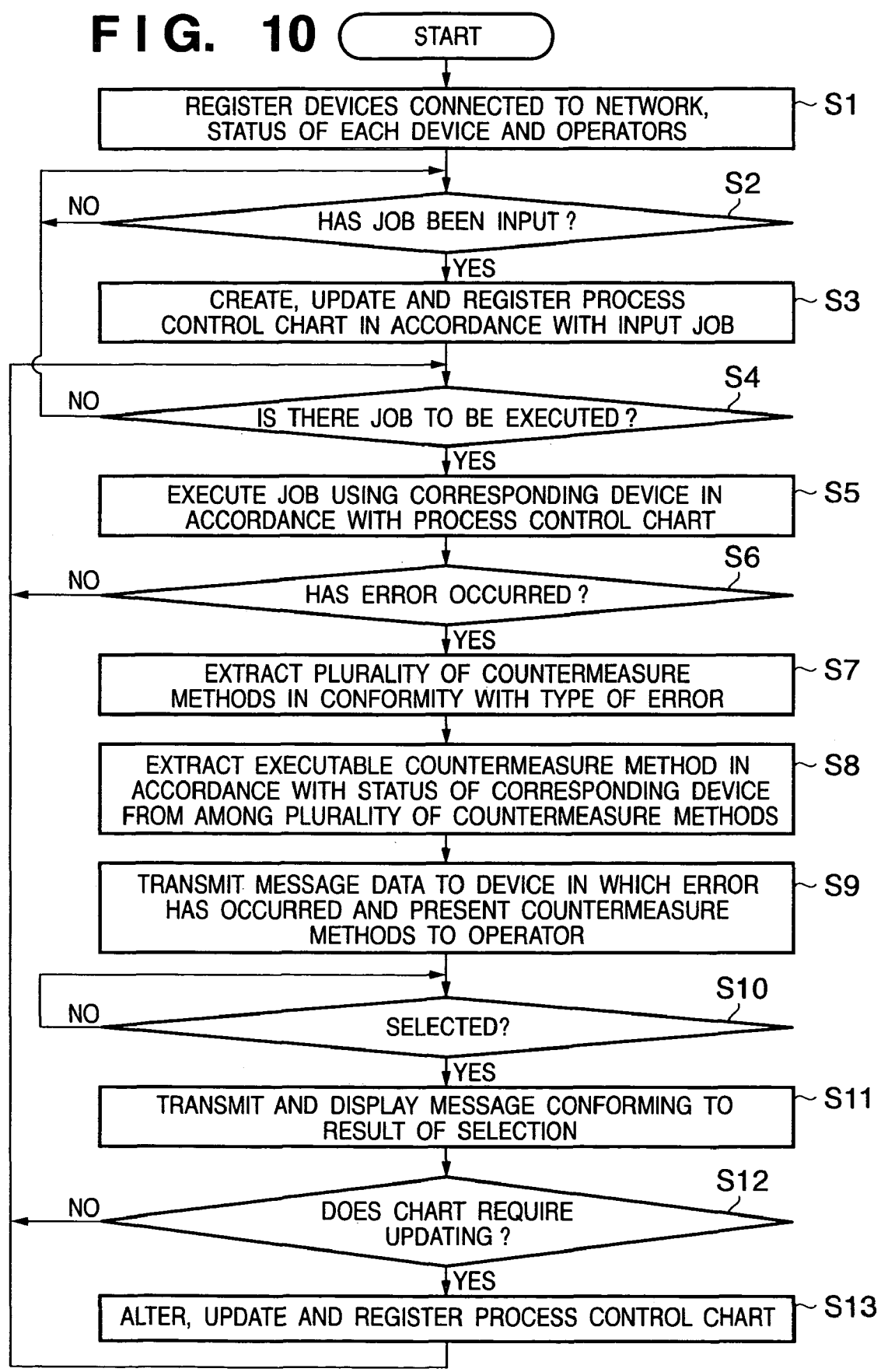
FIG. 10 is a flowchart for describing processing executed by the process control server according to the first embodiment.

FIG. 10 is a flowchart for describing processing executed by the process control server 103 according to the first embodiment. The program for executing this processing is loaded from the storage unit 904 to the RAM 902 and is then executed.

First, at step S1, basic information is acquired. The basic information includes the various devices, such as image forming devices, image input units and finishers, that have been connected to the network 104, the status of each of these devices and information concerning the operators of each of the devices. By way of example, this basic information may be input from the input unit 905 or may be supplied from the computer 108 via the network 104. Next, at step S2, the process control server 103 determines whether a job has been input from the computer 108. If a job has been input, control proceeds to step S3, where the process control server 103 creates, adds to, updates and registers the process control chart 907 in accordance with the input job. As a result, chart data of the kind illustrated in FIG. 5, for example, is registered.

Next, at step S4, the process control server 103 determines whether a job to be executed exists at the present time. This can be determined based upon whether or not the process control chart 907 contains a job that has been registered so as to be executed at the present time. If a job to be executed exists, control proceeds to step S5, where the job is executed using the corresponding device in accordance with the process control chart 907 created at step S3. This is followed by step S6, at which the process control server 103 then determines whether an error of some kind has occurred during execution of this job. If an error has not occurred, control returns to step S4 and processing of the job to be executed continues. If it is found at step S6 that an error of some kind has occurred, then control proceeds to step S7, where the process control server 103 extracts countermeasure methods, which have been set in the countermeasure method list 908, in accordance with the type of error. It should be noted that if a plurality of countermeasure methods have been set for this error in the countermeasure method list 908, then all of the plurality of countermeasure methods are extracted at step S7.

As mentioned above, examples of a plurality of countermeasure methods in case of "NO A4-PAPER" are "REPLENISH SIZE A4 PAPER", "PRINT ON A3 PAPER IN 2-UP FORMAT" if size A3 paper has been loaded, and then cut the paper in half using the trimmer 403, and "EXECUTE PRINTING BY SUBSTITUTING OTHER IMAGE FORMING DEVICE". In addition, also conceivable as error countermeasure methods in case of "NO TONER" are "REPLENISH TONER" and "EXECUTE PRINTING BY SUBSTITUTING OTHER IMAGE FORMING DEVICE", and in case of "PAPER JAMMING HAS OCCURRED", conceivable error countermeasure methods are "ELIMINATE JAMMING", "EXECUTE PRINTING BY SUBSTITUTING OTHER IMAGE FORMING DEVICE" and "REQUEST REPAIRS", etc.

Next, control proceeds to step S8, where the process control server 103 discriminates the status of each device for which countermeasure methods are necessary from among the plurality of countermeasure methods and extracts a countermeasure method candidate that is executable at the present time. If a plurality of candidates executable as countermeasure methods exist, it is necessary to allow the operator of the device in which the error occurred to input an indication as to which of the plurality of candidates should be selected next. Accordingly, at step S9, message data instructing that error countermeasure processing is to be selected is sent to the device in which the error occurred and the message is displayed on the display unit 106 to present the operator with a plurality of countermeasure methods as candidates. In this case, executable error countermeasure methods are presented to the operator, as shown in FIG. 7 described above, and the operator is allowed to select the desired countermeasure method.

If the operator selects a desired countermeasure method at step S10, control proceeds to step S11. Here the process control server 103 creates message data in accordance with the selection by the operator, transmits the data to the device and displays the message on the display unit 106. Then, at step S12, the process control server 103 determines whether it is necessary to update the process control chart 907 in order to execute the countermeasure method that has been selected by the operator. If update is unnecessary, control returns to step S4 following recovery from the error and then the above-described processing is executed. On the other hand, if it is found at step S12 that it is necessary to update the process control chart 907 in order to execute the countermeasure method that has been selected by the operator, then control proceeds to step S13. Here the process control server 103 alters the process control chart 907 in the manner shown in FIG. 8. Control then returns to step S4 and the above-described processing is executed.

Thus, in accordance with the first embodiment, as described above, if an error occurs during execution of a job by a certain device, a countermeasure method is extracted based upon the status of each device connected to the network. If a plurality of countermeasure methods are conceivable, then a plurality of these countermeasure methods are presented to the operator and the operator is allowed to select the desired countermeasure method.

Second Embodiment

Figure 11:
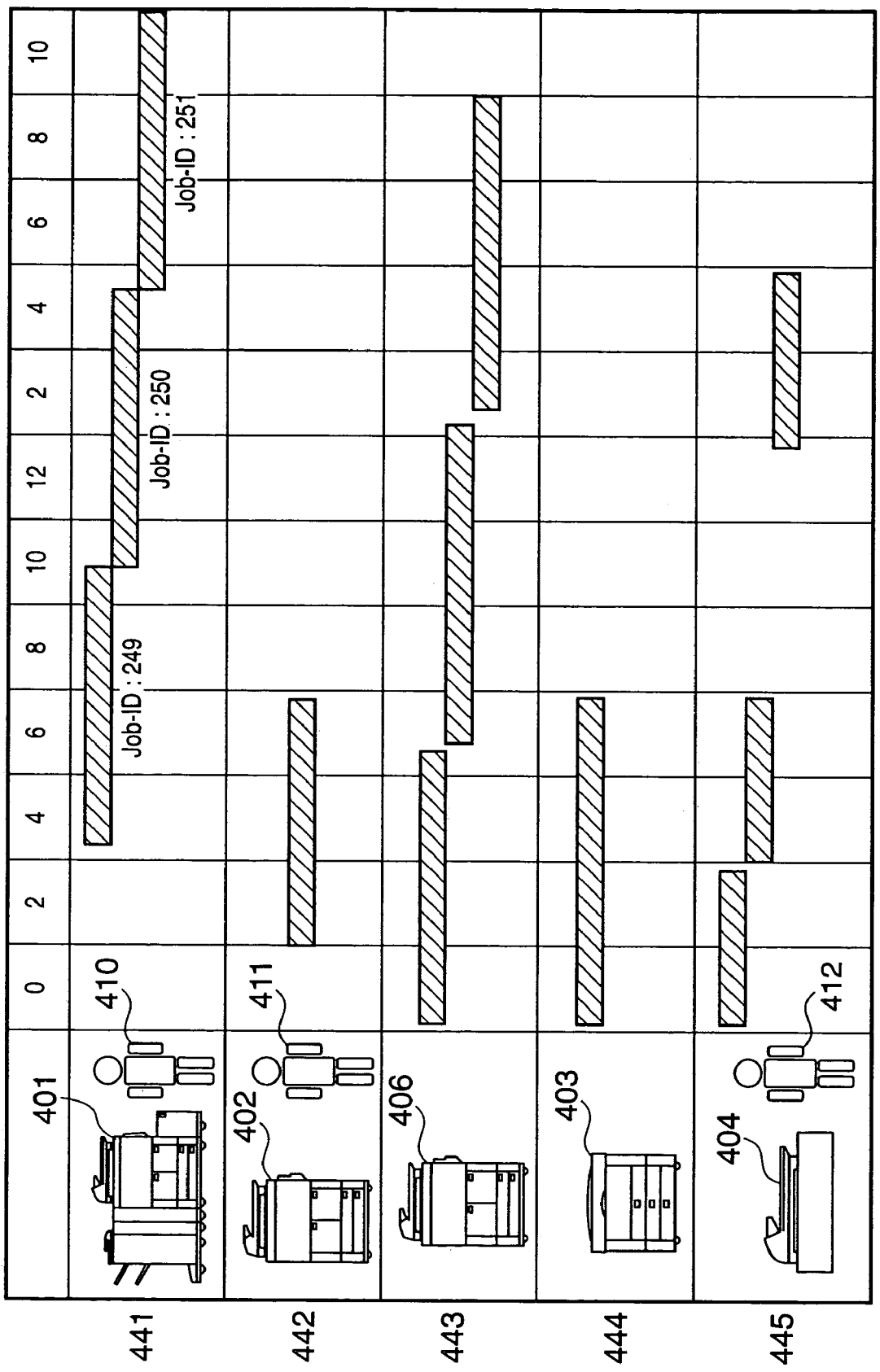
FIG. 11 is a diagram useful in describing a process control chart according to a second embodiment of the present invention.

FIG. 11 is a diagram useful in describing the process control chart 907 according to a second embodiment of the present invention. Portions in FIG. 11 identical with those shown in FIG. 5 are designated by like reference characters and need not be described again.

Figure 12:
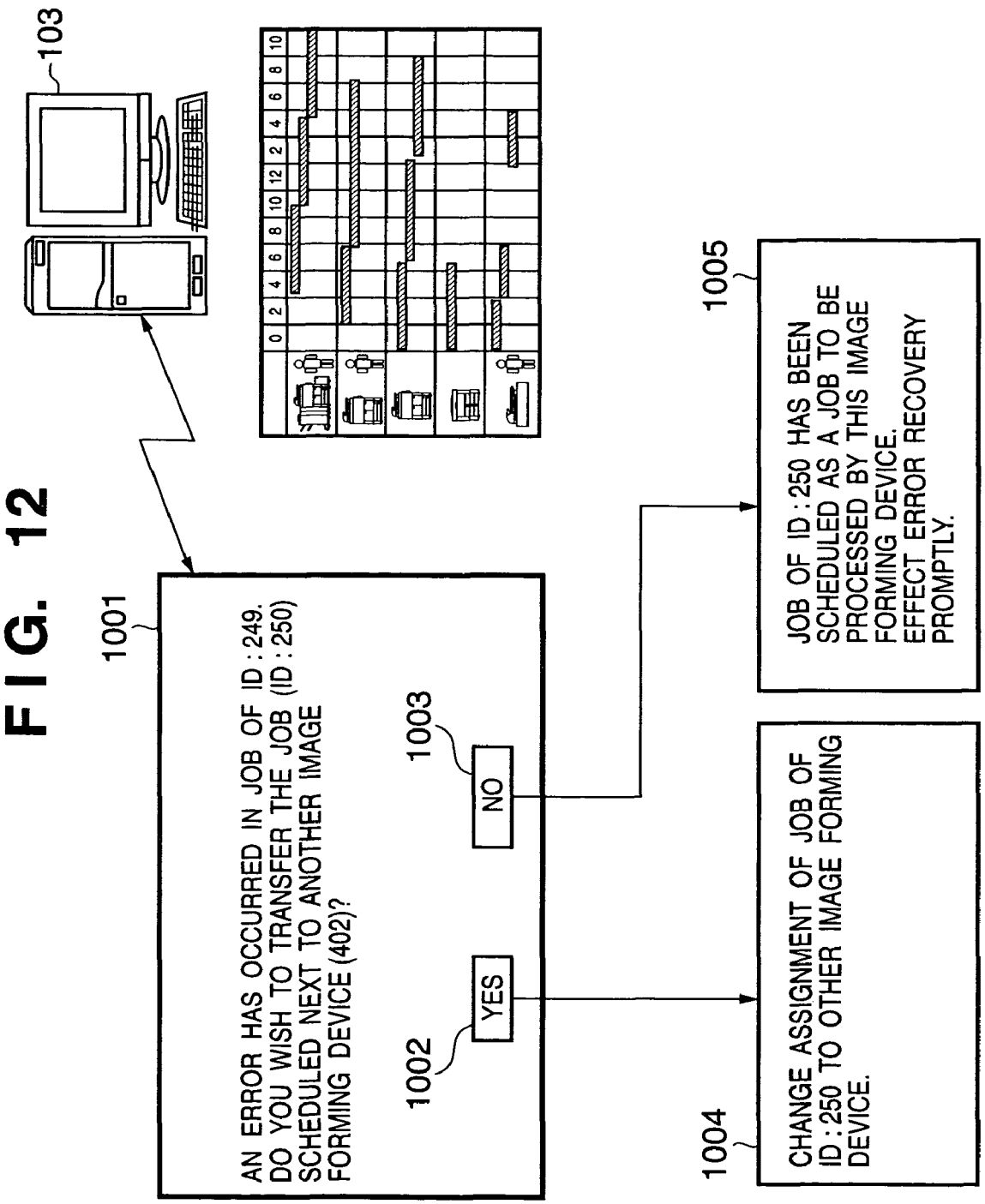
FIG. 12 is a diagram useful in describing a message displayed on the display unit of an image forming device from a process control server in a case where a job error has occurred in an image forming device according to the second embodiment.

It is assumed in FIG. 11 that an error of some kind has occurred in the image forming device 401 during execution of "Job-ID: 249", by way of example. In this case, a message of the kind indicated at 1001 in FIG. 12 is displayed on the display unit 106 of the image forming device 401 with regard to processing of job "Job-ID: 250" that has been scheduled for the image forming device 401 and that follows the job in which the error has occurred. The message displayed is as follows: "AN ERROR HAS OCCURRED IN JOB OF ID: 249. DO YOU WISH TO TRANSFER THE JOB (ID: 250) SCHEDULED NEXT TO ANOTHER IMAGE FORMING DEVICE (402)?"

This indicates that since an error has occurred in the image forming device 401, the other image forming device 402 can be substituted for the image forming device 401 to execute the processing of the job "Job-ID: 250" scheduled next. Of course, in this case the process control server 103 can decide that printing by the substitute image forming device is possible upon using the process control chart 907 to check the status of the operator 411 of image forming device 402.

Figure 13:
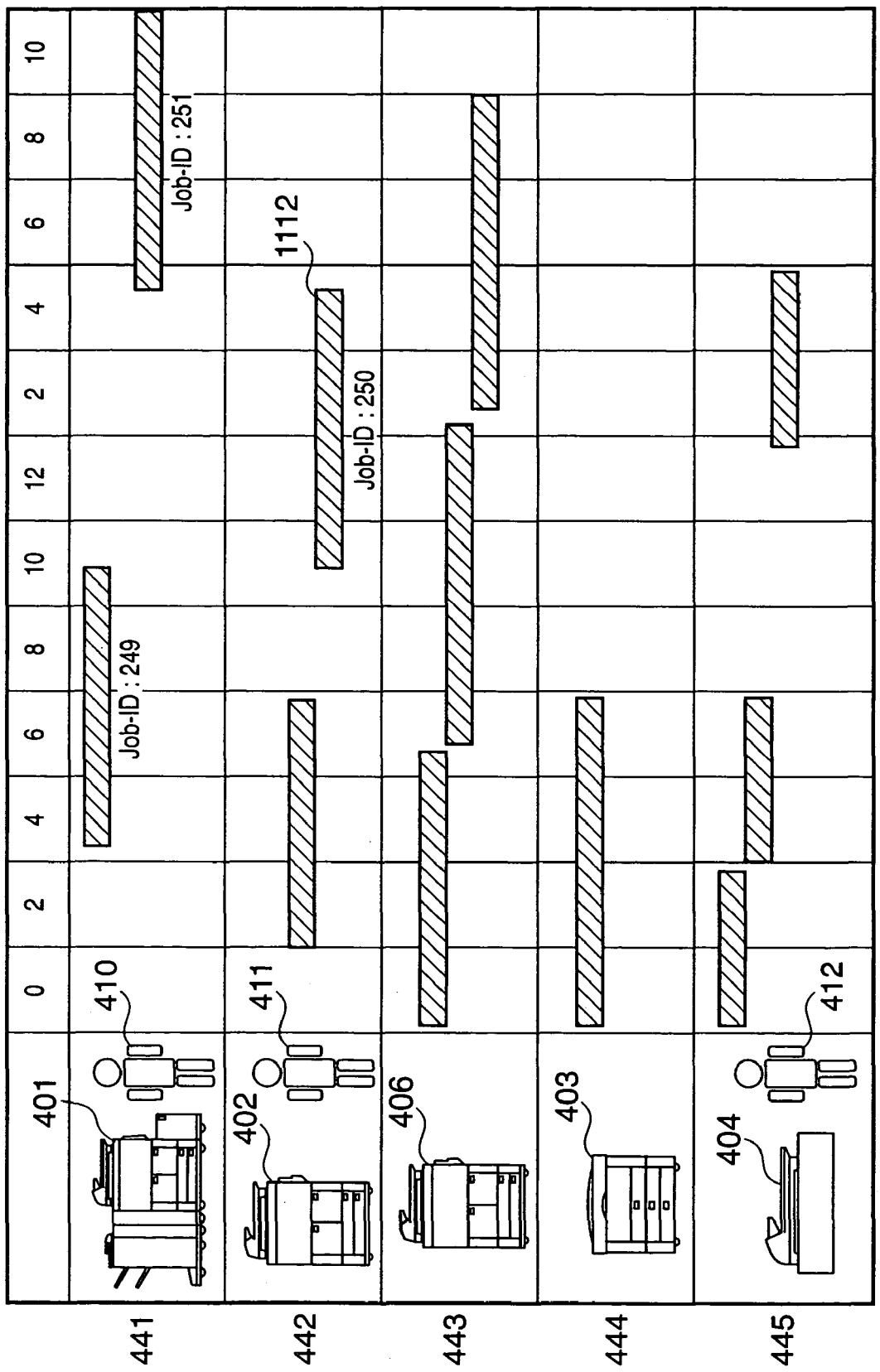
FIG. 13 is a diagram useful in describing an example of change of a process control chart according to the second embodiment of the present invention.

Accordingly, the operator judges the conditions of the printing site and selects either a selection button "YES" 1002 or a selection button "NO" 1003. If the operator selects the selection button "YES" 1002, the following message (1004) is displayed: "CHANGE ASSIGNMENT OF JOB OF ID: 250 TO OTHER IMAGE FORMING DEVICE (402)". If the operator selects the selection button "NO" 1003, then the following message (1005) is displayed: "JOB OF ID: 250 HAS BEEN SCHEDULED AS A JOB TO BE PROCESSED BY THIS IMAGE FORMING DEVICE. EFFECT ERROR RECOVERY PROMPTLY." If, by way of example, the selection button "YES" 1002 has been selected, then, as illustrated in at 1112 in FIG. 13, job "Job-ID: 250" of image forming device 401 is removed and job "Job-ID: 250" is assigned to image forming device 402 instead.

It should be noted that since the processing according to the second embodiment also can be implemented in a manner similar to that of the flowchart of the first embodiment, this processing need not be described again.

Thus, in accordance with the second embodiment, as described above, if an error occurs during execution of a job by a certain device, a selection can be made as to whether another device having substantially the same functions can be substituted to execute the processing of this job.

Third Embodiment

A third embodiment of the present invention will be described next. In the third embodiment, it is so arranged that a plurality of countermeasure methods for dealing with a specific error that occurs in a certain device are displayed in an order of priority and a desired one of these countermeasure methods can be selected.

Figure 14:
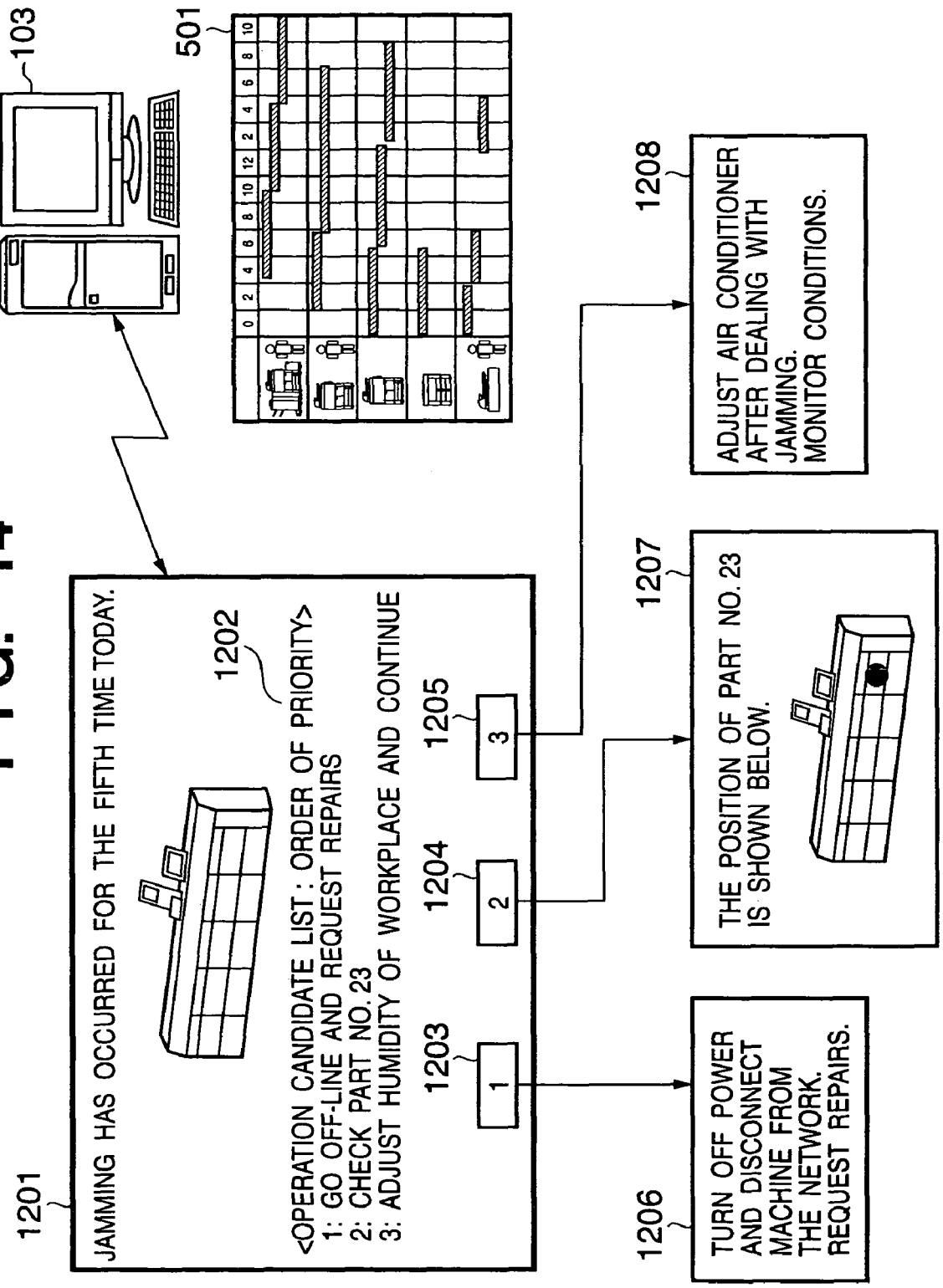
FIG. 14 is a diagram useful in describing an example of display of messages by a process control server according to a third embodiment of the present invention.

FIG. 14 is a diagram useful in describing an example of display of messages by the process control server 103 according to the third embodiment of the present invention.

Described here will be a case where jamming has occurred in the image forming device 401 for a fifth time on a single day. Reference numeral 1201 denotes an error message displayed on the display unit 106 of the console 105. The prior art is such that in a case where paper jamming, for example, has occurred, a message instructing that the jammed paper should be removed is merely displayed and sometimes the display is accompanied by an animation. By contrast, the third embodiment is such that after it has grasped the overall process, the process control server 103 presents an error recovery operation believed to be best to the operator 410 in the form of a list of operation candidates ranked to have an order of priority.

In the example of FIG. 14, the following operation candidate list 1202, which is arranged in order of decreasing priority, is displayed on the display unit 106 and presented to the operator 410 when the fifth paper jamming event has occurred in the image forming device 401:

1: Go off-line and request repairs
2: Check Part No. 23
3: Adjust humidity of workplace and continue Buttons 1203 to 1205 are for selecting any one operation candidate from the plurality thereof. Here the operator 410 can select what is believed to be the most efficient operation from the list 1202 by taking the status of the workplace into account and then designating the particular button. For example, if the operator selects button 1203, then "GO OFF-LINE AND REQUEST REPAIRS" is selected. In response, a message reading "TURN OFF POWER AND DISCONNECT MACHINE FROM THE NETWORK. REQUEST REPAIRS." is displayed as the next screen on the display unit 106, as indicated at 1206 in FIG. 14. The operator 410 performs an operation in accordance with this message.

If the operator selects button 1204, then "CHECK PART NO. 23" is selected. In response, as the next screen, an image in which a symbol indicating the position of the part has been appended to the picture of the image forming device 401 is displayed on the display unit 106 together with a message reading "THE POSITION OF PART NO. 23 IS SHOWN BELOW.", as indicated at 1207 in FIG. 14. Accordingly, the operator performs an inspection of Part No. 23 in accordance with this message.

If the operator selects button 1205, then "ADJUST HUMIDITY OF WORKPLACE AND CONTINUE" is selected. In response, a message reading "ADJUST AIR CONDITIONER AFTER DEALING WITH JAMMING. MONITOR CONDITIONS." is displayed as the next screen on the display unit 106, as indicated at 1208 in FIG. 14. The operator performs an operation, such as lowering the humidity setting of an air conditioner, in accordance with this message.

Thus, as a result of the process control server 103 receiving the item of operation selected at the image forming device 401 from the image forming device 401, an operation for resetting the process in the process control server 103 is performed and the job is executed accordingly. Thus, the processing efficiency of the overall printing site can be improved.

Thus, the process control server 103 indicates operation candidates, which have been ranked in order of priority, to an operator who has ascertained the conditions of the overall printing site, and the operator, who is thoroughly familiar with the conditions of this printing site, is capable of selecting from this list of operations the operation believed to be the most effective. The result of the selection made by the operator is fed back to the process control server 103 and the process control chart is updated as necessary. As a result, processing that has been predetermined with respect to a certain error is not merely indicated. Rather, efficient processing that is in line with the conditions of the printing site and the judgments rendered by operators can be executed.

It should be noted that processing according to the third embodiment can be executed in a manner similar to that of the flowchart of FIG. 10 according to the first embodiment. If a plurality of countermeasure candidates could be extracted in such case, then, at step S9, it would suffice to decide the order of priority from these candidates using highest efficiency or greatest likelihood that repair will be possible as the reference and then display the plurality of countermeasure candidates in accordance with the order of priority. Other processing can be implemented in a manner similar to that of the flowchart of FIG. 10.

Fourth Embodiment

A fourth embodiment of the present invention will be described next. The fourth embodiment proposes a printing system in which when an operator is allowed to select the contents of an operation as in the third embodiment, resetting of the next process is performed automatically in accordance with an internal order of priority if the operator has not made a selection or decision upon elapse of a prescribed period of time.

Figure 15:
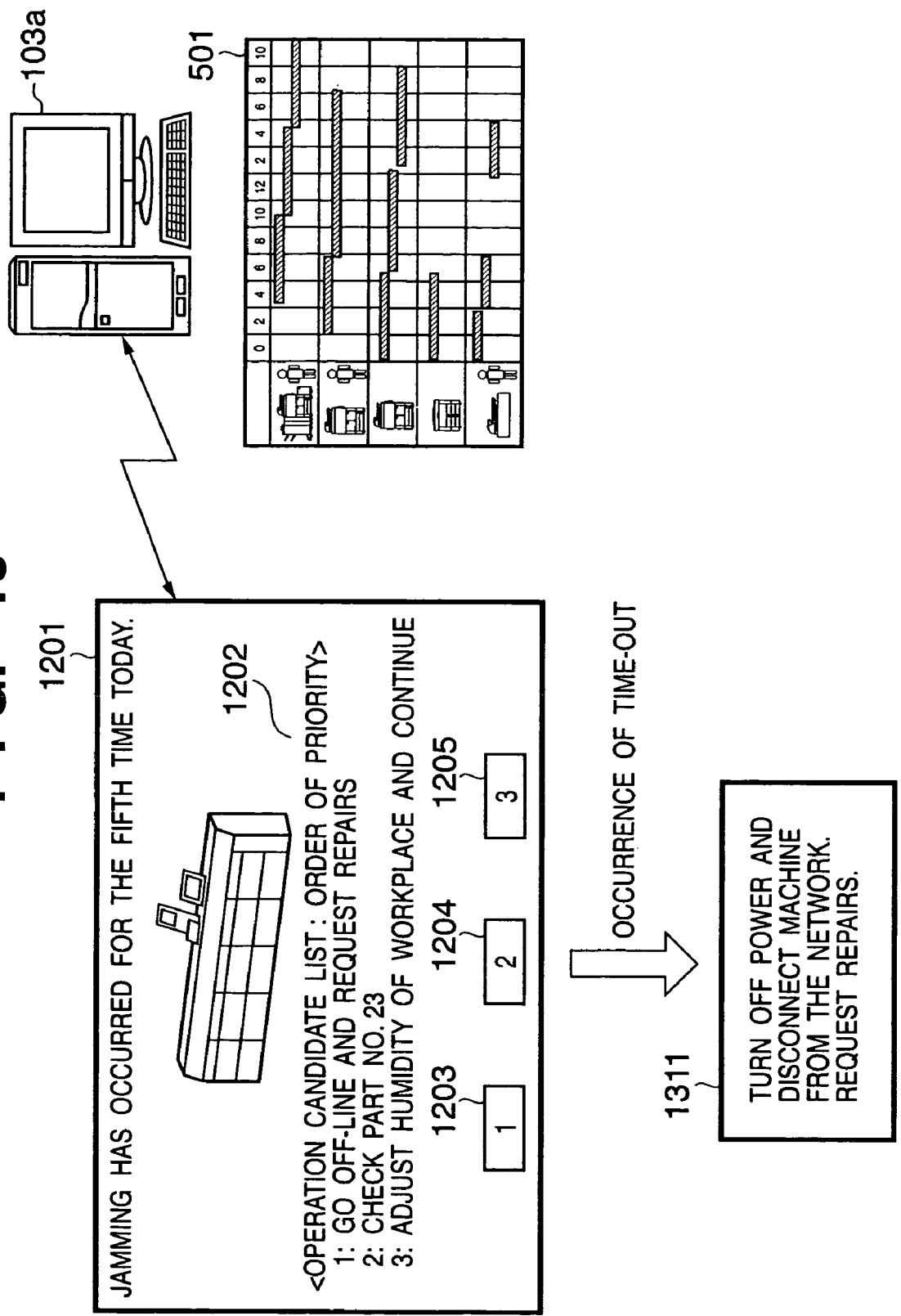
FIG. 15 is a diagram useful in describing an example of display of messages by a process control server, as well as occurrence of time-out, according to a fourth embodiment of the present invention.

FIG. 15 is a diagram useful in describing an example of display of messages by the process control server 103, as well as occurrence of time-out, according to the fourth embodiment of the present invention. Portions in FIG. 15 identical with those shown in FIG. 14 of the third embodiment are designated by like reference characters and need not be described again.

Consider a case where the list 1201 ranked in order of priority relating to jamming as described above in the third embodiment is displayed. A time-out occurs if there is no input from the operator despite elapse of a prescribed period of time. If the time-out occurs, the operator is instructed to execute "GO OFF-LINE AND REQUEST REPAIRS" (1301), which has the highest priority. Alternatively, if the image forming device 401 in which the error occurred is capable of being taken off-line by a remote operation, then the image forming device 401 may be taken off-line forcibly.

Figure 16:
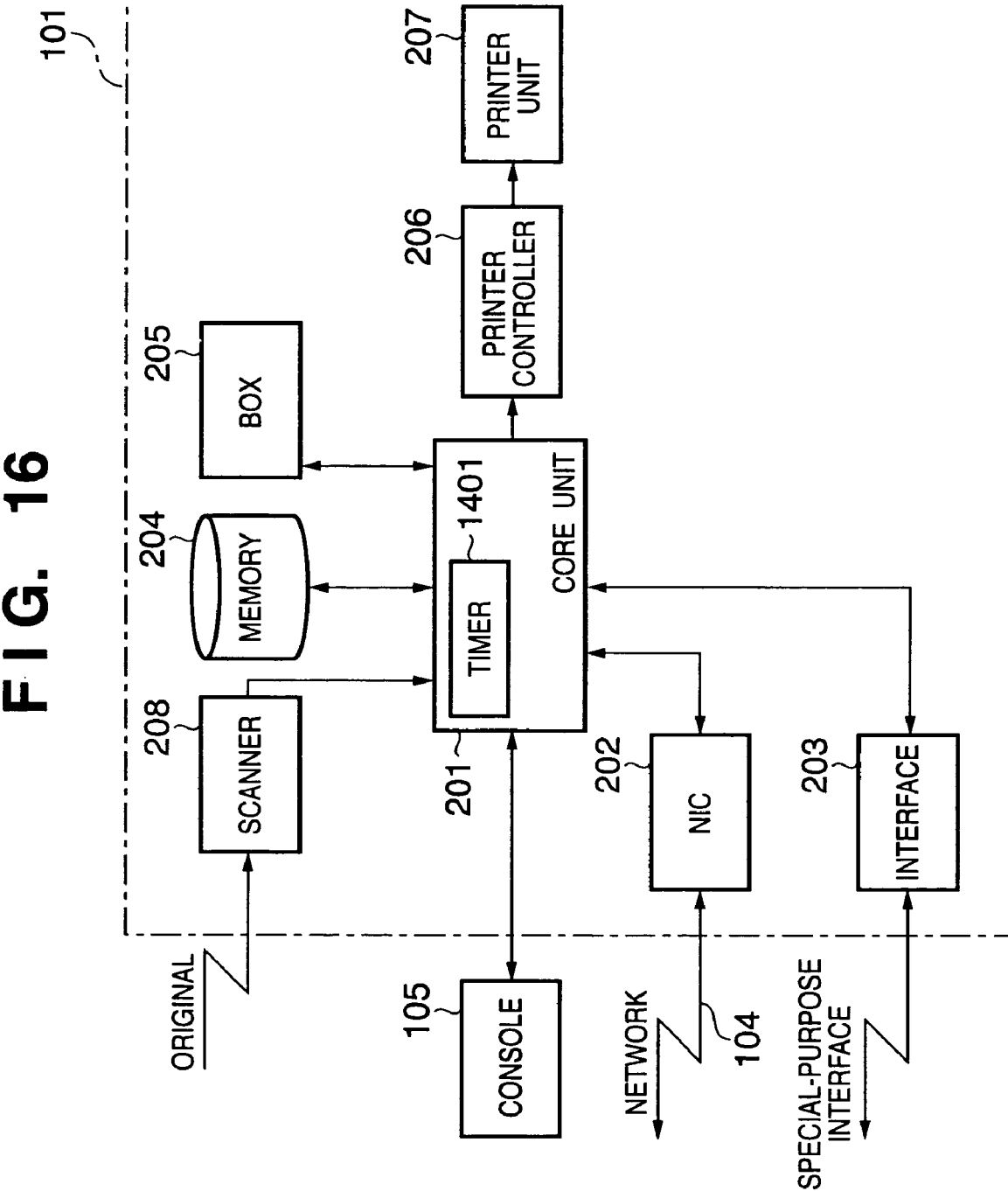
FIG. 16 is a block diagram for describing the functional configuration of an image forming device according to the fourth embodiment of the present invention.

FIG. 16 is a block diagram for describing the functional configuration of the image forming device 101 according to the fourth embodiment of the present invention. Components identical with those in FIG. 2 are designated by like reference characters.

In order to execute timer processing, the core unit 201 of image forming device 101 is provided with a timer 1401 at a section where communication with the console 105 is carried out. The timer 1401 measures the time that elapses from display of a message to input made by the operator and compares this elapsed time with a time that has been input previously from the console 105 as a set item or with a default time that was set in the system initially. If the elapsed time exceeds the set time, information is sent back to the process control server 103 of FIG. 13 and a message of the kind shown at 1311 in FIG. 15 is displayed in accordance the conditions.

Figure 17:
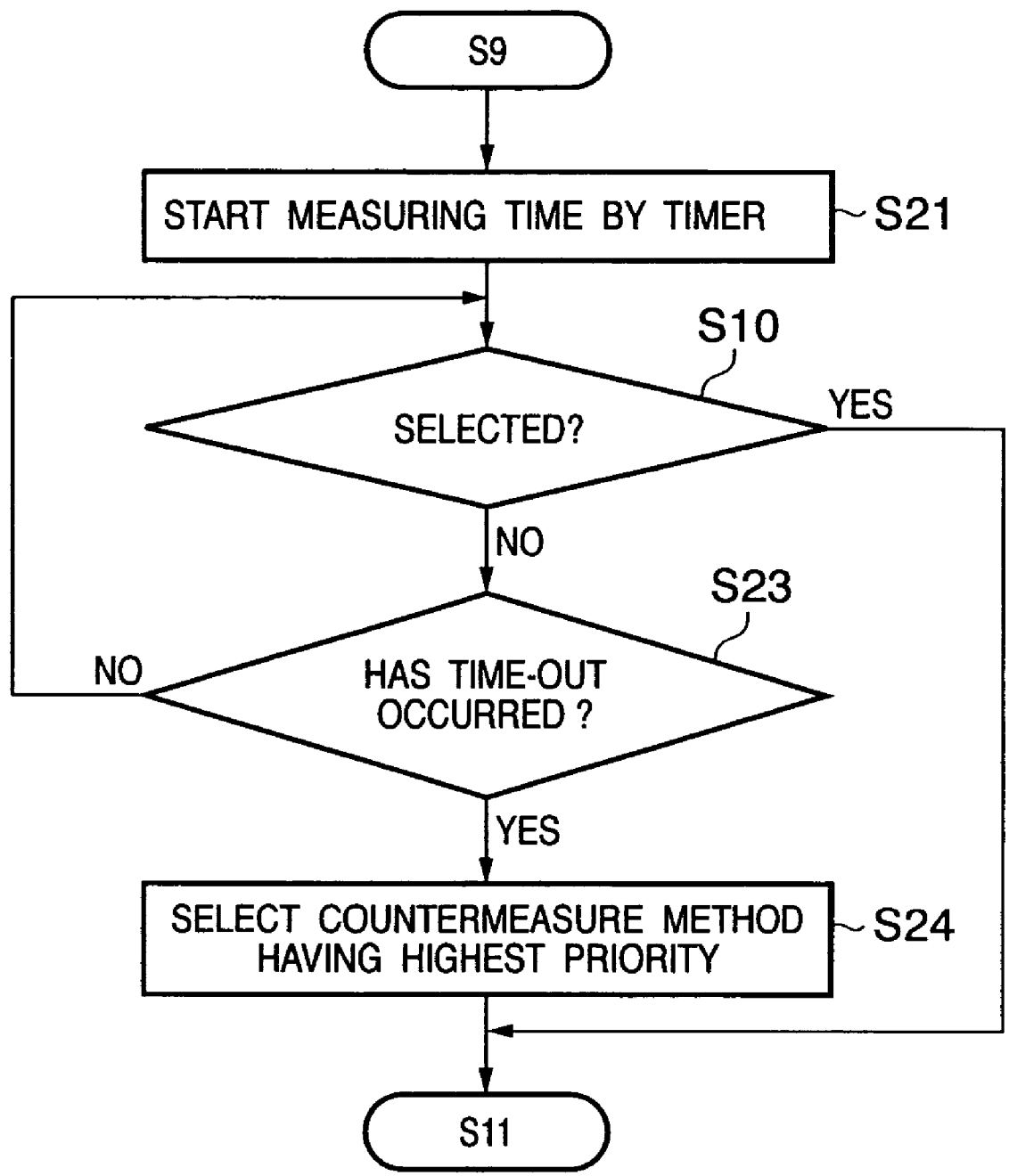
FIG. 17 is a flowchart for describing processing according to the fourth embodiment.

A flowchart illustrating processing in this case is shown in FIG. 17. The processing indicated by the flowchart of FIG. 17 is executed by the image forming device 101 between steps S9 and S11 in FIG. 10. It goes without saying that the processing of FIG. 17 may be executed by the process control server 103 using an internal timer of the server 103.

After the plurality of countermeasure methods have been presented to the operator at step S9, control proceeds to step S21, at which timekeeping by the timer 401 is started. If the operator makes an input selecting and designating a countermeasure method, control proceeds to step S11; otherwise, control proceeds to step S23. Here it is determined whether a time-out has occurred owing to elapse of the prescribed period of time. If a time-out does not occur, control returns to step S10. If a time-out occurs, however, control proceeds to step S24. Here the countermeasure method having the highest priority or the countermeasure method set as the default is selected from among the plurality of countermeasure methods. Control then proceeds to step S11.

Thus, in accordance with the fourth embodiment, processing can continue without the operation of the overall system being halted even in a case where the operator fails to make a selection and designation.

Fifth Embodiment

FIG. 18 is a diagram useful in describing processing according to a fifth embodiment of the present invention. According to the fifth embodiment, the process control server 103 prompts the operator for an input of information at regular time intervals in order to ascertain the status of the operator and the status of the job regardless of whether or not an error occurs in an image forming device per se or in the job per se.

In the example of FIG. 18, the operator is allowed to select and designate either "YES" 1502 or "NO" 1503 in response to an inquiry "IS THERE A PROBLEM WITH THE STATUS OF PROCESSING?" indicated at 1501. As a result, the process control server 103 can ascertain the status of operator performance, such as whether the operator has left is post, whether he is working efficiently or whether he is concentrating on his duties. Further, the process control server 103 is capable of cooperating with another server 1505 that manages personnel information.

Sixth Embodiment

A sixth embodiment of the present invention will now be described. An example in which use is made of a display unit and input unit connected to an image forming device has been described in the first to fifth embodiments. In a sixth embodiment, however, an LCD panel or ordinary display monitor and devices such as a keyboard and mouse may also be provided on an image input unit or on the collator of a finishing device. In other words, it will suffice if the arrangement is one that is capable of communicating messages to the operator of a device in which an error has occurred.

Other Embodiments

Although embodiments of the present invention have been described in detail, the present invention may be applied to a system constituted by a plurality of devices or to an apparatus comprising a single device.

Furthermore, there are cases where the object of the invention is attained also by supplying a software program, which implements the functions of the foregoing embodiments, directly or remotely to a system or apparatus, reading the supplied program codes with a computer of the system or apparatus, and then executing the program codes. In this case, so long as the system or apparatus has the functions of the program, the mode of implementation need not rely upon a program. Accordingly, since the functions of the present invention are implemented by computer, the program codes per se installed in the computer also implement the present invention. In other words, the present invention also covers a computer program per se that is for the purpose of implementing the functions of the present invention. In this case, so long as the system or apparatus has the functions of the program, the form of the program, e.g., object code, a program executed by an interpreter or script data supplied to an operating system, etc., does not matter.

Examples of storage media that can be used for supplying the program are a floppy disk (registered trademark), hard disk, optical disk, magneto-optical disk, CD-ROM, CD-R, CD-RW, magnetic tape, non-volatile type memory card, ROM, DVD (DVD-ROM, DVD-R), etc. As for the method of supplying the program, the client computer can be connected to a website on the Internet using a browser possessed by the client computer, and the computer program per se of the present invention or an automatically installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer also is covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to run the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiment can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

The present invention is not limited to the above embodiments and various changes and modifications can be made within the spirit and scope of the present invention. Therefore, to apprise the public of the scope of the present invention, the following claims are made.

CLAIM OF PRIORITY

This patent application claims priority from Japanese Patent Application No. 2004-228015 filed on Aug. 4, 2004, which is hereby incorporated by reference.

What is claimed is:

1. A process control server for managing a plurality of printing devices that perform print jobs and can be connected to the process control server via a network, the process control server, comprising:
 a reception unit configured to receive a plurality of print jobs to be executed in any of the plurality of printing devices;
 a schedule setting unit configured to set a schedule to execute the plurality of print jobs received by the reception unit;
 a job execution unit configured to cause at least one of the plurality of printing devices to execute a print job based upon the schedule set by the schedule setting unit;
 a determining unit configured to determine whether an error has occurred during execution of the print job executed by the job execution unit;
 an extraction unit configured to extract, in a case where it is determined by the determining unit that the error has occurred during the execution of the print job, a plurality of countermeasure operations with respect to the error, wherein the plurality of countermeasure operations are extracted for an operator of one of the plurality of printing devices in which the error has occurred during execution of the print job, and wherein the plurality of countermeasure operations including a first operation for eliminating the error and a second operation for executing the print job by a printing device other than the printing device in which the error has occurred; and a transmission unit configured to transmit message data to the printing device in which the error has occurred, wherein the message data corresponds to the countermeasure operations extracted by the extraction unit and the message data causes a display unit of the printing device in which the error has occurred to display a message for causing the operator of the printing device in which the error has occurred to select one of the plurality of countermeasure operations extracted by the extraction unit, wherein the schedule setting unit updates the schedule in accordance with the countermeasure operation selected by the operator of the printing device in which the error has occurred.

2. The server according to claim 1,
wherein the extraction unit extracts the plurality of countermeasure operations in accordance with an order of priority, and
wherein the message data for causing the operator to select one of the plurality of countermeasure operations is displayed in accordance with the order of priority.

3. The server according to claim 2, further comprising:
a timekeeping unit configured to measure a period of time that elapses after the message for causing the operator to select one of the plurality of countermeasure operations is displayed on the display unit,
wherein the schedule setting unit updates the schedule in accordance with the order of priority of the plurality of countermeasure operations extracted by the extraction unit in a case where the period of time measured by the timekeeping unit exceeds a predetermined period of time.

4. The server according to claim 1, further comprising a counter unit for counting errors occurred in the at least one of the plurality of printing devices that executes the print job;
wherein the transmission unit transmits the message data in a case where a count value counted by the counter unit for the printing device in which the error has occurred exceeds a predetermined value.

5. A process control system including a plurality of printing devices for performing print jobs and a process control server, which is connected to the plurality of printing devices via a network and manages the plurality of printing devices, wherein the process control server comprises:
a reception unit configured to receive a plurality of print jobs to be executed in any of the plurality of printing devices;
a schedule setting unit configured to set a schedule to execute the plurality of print jobs received by the reception unit;
a job execution unit configured to cause at least one of the plurality of printing devices to execute a print job based upon the schedule set by the schedule setting unit;
a determining unit configured to determine whether an error has occurred during execution of the print job executed by the job execution unit;
an extraction unit configured to extract, in a case where it is determined by the determining unit that the error has occurred during the execution of the print job, a plurality of countermeasure operations with respect to the error, wherein the plurality of countermeasure operations are extracted for an operator of one of the plurality of printing devices in which the error has occurred during execution of the print job, and wherein the plurality of countermeasure operations including a first operation for eliminating the error and a second operation for executing the print job by a printing device other than the printing device in which the error has occurred; and a transmission unit configured to transmit message data to the printing device in which the error has occurred, wherein the message data corresponds to the countermeasure operations extracted by the extraction unit and the message data causes a display unit of the printing device in which the error has occurred to display a message for causing the operator of the printing device in which the error has occurred to select one of the plurality of countermeasure operations extracted by the extraction unit, wherein the schedule setting unit updates the schedule in accordance with the countermeasure operation selected by the operator of the printing device in which the error has occurred.

6. A process control method of managing a plurality of printing devices that perform print jobs and can be connected to the process control server via a network, the method comprising:
a reception step of receiving a plurality of print jobs to be executed in any of the plurality of printing devices;
a schedule setting step of setting a schedule of each device to execute the plurality of print jobs received in the reception step;
a job execution step of causing at least one of the plurality of printing devices to execute a print job based upon the schedule set in the schedule setting step;
a determining unit configured to determine whether an error has occurred during execution of the print job executed by the job execution unit;
an extraction step of extracting, in a case where it is determined in the determining step that the error has occurred during the execution of the print job, a plurality of countermeasure operations with respect to the error, wherein the plurality of countermeasure operations are extracted for an operator of one of the plurality of printing devices in which the error has occurred during execution of the print job, and wherein the plurality of countermeasure operations including a first operation for eliminating the error and a second operation for executing the print job by a printing device other than the printing device in which the error has occurred; and a transmission step of transmitting message data to the printing device in which the error has occurred, wherein the message data corresponds to the countermeasure operations extracted in the extraction step and the message data causes a display unit of the printing device in which the error has occurred to display a message for causing the operator of the printing device in which the error has occurred to select one of the plurality of countermeasure operations extracted in the extraction step, wherein in the schedule setting step, the schedule is updated in accordance with the countermeasure operation selected by the operator of the printing device in which the error has occurred.

7. The method according to claim 6,
wherein the extraction step extracts the plurality of countermeasure operations in accordance with an order of priority, and wherein the message data for causing the operator to select one of the plurality of countermeasure operations is displayed in accordance with the order of priority.

8. The method according to claim 7, further comprising:

a timekeeping step of measuring a period of time that elapses after the message for causing the operator to select one of the countermeasure operations is displayed on the display unit, wherein in the schedule setting step, the schedule is updated in accordance with the order of priority of the plurality of countermeasure operations extracted in the extraction step in a case where the period of time measured in the timekeeping step exceeds a predetermined period of time.

9. The method according to claim 6, further comprising a counting step of counting errors occurred in the at least one of the plurality of printing devices that executes the print job;

wherein in the transmission step, the message data is transmitted in a case where a count value counted in the counting step for the printing device in which the error has occurred exceeds a predetermined value.

* * * * *